United States Patent
Saitoh

(10) Patent No.: US 10,370,474 B2
(45) Date of Patent: Aug. 6, 2019

(54) OPTICAL COMPOSITION, CURED PRODUCT, AND OPTICAL ELEMENT

(71) Applicant: CANON KABUSHIKI KAISHA, Tokyo (JP)

(72) Inventor: Terunobu Saitoh, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/494,956

(22) Filed: Apr. 24, 2017

(65) Prior Publication Data

US 2017/0320984 A1 Nov. 9, 2017

(30) Foreign Application Priority Data

May 6, 2016 (JP) .................................. 2016-093263

(51) Int. Cl.
*C08F 222/24* (2006.01)
*G02B 1/04* (2006.01)
(Continued)

(52) U.S. Cl.
CPC .......... *C08F 222/24* (2013.01); *B32B 27/286* (2013.01); *C08F 228/04* (2013.01);
(Continued)

(58) Field of Classification Search
CPC ................................................... C08F 222/24
(Continued)

(56) References Cited

U.S. PATENT DOCUMENTS 8,569,541 B2 10/2013 Saitoh
8,829,230 B2 9/2014 Saitoh
(Continued)

FOREIGN PATENT DOCUMENTS

JP 2012-167019 A 9/2012
JP 2014-43565 A 3/2014
JP 2014-198814 A 10/2014

*Primary Examiner* — Duc Truong
(74) *Attorney, Agent, or Firm* — Venable LLP

(57) ABSTRACT

Provided is a cured product having the following characteristics: the dispersion characteristic and secondary dispersion characteristic of refractive indices are high, the cured product hardy crystallizes, and a chromatic aberration-correcting function is high. The cured product contains at least a structure represented by the general formula (4) and a structure represented by the general formula (5), in which a content of the structure represented by the general formula (5) in the cured product is 0.01 or more and 0.10 or less in terms of a substance amount ratio with respect to the structure represented by the general formula (4).

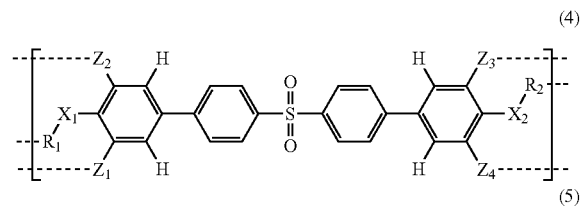

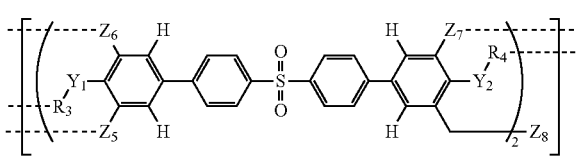

14 Claims, 1 Drawing Sheet

(51) Int. Cl.
*B32B 27/28* (2006.01)
*C08F 228/04* (2006.01)

(52) U.S. Cl.
CPC ........ *G02B 1/041* (2013.01); *B32B 2307/412* (2013.01); *B32B 2551/00* (2013.01)

(58) Field of Classification Search
USPC .................................................. 428/41, 419
See application file for complete search history.

(56) References Cited

U.S. PATENT DOCUMENTS 9,290,597 B2 3/2016 Saitoh
2015/0344782 A1 12/2015 Matsuyama et al.

OPTICAL COMPOSITION, CURED PRODUCT, AND OPTICAL ELEMENT

BACKGROUND OF THE INVENTION

Field of the Invention

The present invention relates to an optical composition, a cured product, and an optical element, and more particularly, to an optical composition using a (meth)acrylate compound, which has specific optical characteristics, a cured product, and an optical element.

Description of the Related Art

In general, the refractive index of an optical material formed of a glass material, an organic resin, or the like gradually increases as the wavelength of light to be refracted by the material becomes shorter. Indicators each representing the wavelength dispersibility of the refractive index are, for example, an Abbe number (dispersion characteristic) ($v_d$) and a secondary dispersion characteristic ($\theta g,F$). The Abbe number and the $\theta g,F$ value are values peculiar to each optical material, but in many cases, the values each fall within a certain range. FIG. 1 is a graph for showing a relationship between the secondary dispersion characteristic and Abbe number of each of conventional optical materials (a glass material and an organic material).

The Abbe number ($v_d$) and the secondary dispersion characteristic ($\theta g,F$) are represented by the following equations:

Abbe number [$v_d$]=($n_d$-1)/($n_F$-$n_C$)

Secondary dispersion characteristic [$\theta g,F$]=($n_g$-$n_F$)/($n_F$-$n_C$)

where $n_d$ represents a refractive index at a wavelength of 587.6 nm, $n_F$ represents a refractive index at a wavelength of 486.1 nm, $n_C$ represents a refractive index at a wavelength of 656.3 nm, and $n_g$ represents a refractive index at a wavelength of 435.8 nm.

Accordingly, in a refracting optical system, a chromatic aberration can be reduced by appropriately combining glass materials having different dispersion characteristics. In, for example, the objective lens of a telescope or the like, a chromatic aberration appearing on its optical axis is corrected by using the following materials in combination: a glass material having small dispersion is used as a positive lens, and a glass material having large dispersion is used as a negative lens. However, for example, when the constructions and number of lenses are limited, or when glass materials to be used are limited, it may become extremely difficult to sufficiently correct the chromatic aberration. One method of solving such problem is a method involving exploiting a glass material having an abnormal dispersion characteristic, and the design of optical elements involving utilizing the method has been performed.

In addition, when an optical element that is excellent in chromatic aberration-correcting function and has, for example, an aspherical shape as its shape is produced, a method involving, for example, molding an organic material on a glass material, such as a spherical glass, has the following advantage over a method involving using only a glass material as a material: an optical element excellent in mass productivity, moldability, degree of freedom in shape, and lightweight property can be produced. However, the optical characteristic of a conventional organic material falls within a certain limited range (its secondary dispersion characteristic [$\theta g,F$] is 0.700 or less) as shown in FIG. 1, and hence the number of organic materials showing specific dispersion characteristics is extremely small.

Further, most of the organic materials showing specific dispersion characteristics are each a molecule having the following features: a conjugated structure is built by a double bond, a benzene ring, or the like, and the molecule has high rigidity or a high orientation property and is hence liable to crystallize. Accordingly, when any one of the organic materials showing specific dispersion characteristics is used as an optical composition having added thereto various additives, a nonuniform portion may occur in the composition owing to the crystallization of the organic material.

In such background as described above, in Japanese Patent Application Laid-Open No. 2012-167019, there is a proposal that a specific sulfone (meth)acrylate have a higher secondary dispersion characteristic (higher $\theta g,F$ characteristic) than that of a general-purpose organic material.

In addition, in Japanese Patent Application Laid-Open No. 2014-43565, there is a proposal that a branched chain substituent be introduced into the same molecular skeleton as that of Japanese Patent Application Laid-Open No. 2012-167019 for reducing a birefringent index.

SUMMARY OF THE INVENTION

Although the organic material disclosed in Japanese Patent Application Laid-Open No. 2012-167019 has a high $\theta g,F$ value, owing to its molecular structure, the material is liable to be oriented and is hence liable to be a crystal. In addition, the material disclosed in Japanese Patent Application Laid-Open No. 2014-43565 also has a high $\theta g,F$ value. However, the material has the same molecular skeleton as that of the organic material disclosed in Japanese Patent Application Laid-Open No. 2012-167019, and hence the material is liable to be a crystal despite the fact that the material has a branched structure on a side chain thereof.

The present invention has been made in view of the above-mentioned background art, and provides an optical composition having the following features and a cured product obtained by polymerizing the composition, and an optical element using the cured product: the dispersion characteristic (Abbe number ($v_d$)) and secondary dispersion characteristic ($\theta g,F$) of refractive indices fall within an area useful for optical design (an area B in FIG. 1), and a period for crystallization can be made longer than those of the organic materials disclosed in Japanese Patent Application Laid-Open No. 2012-167019 and Japanese Patent Application Laid-Open No. 2014-43565.

An optical composition that solves the problems is an optical composition containing at least a compound represented by the general formula (1) and a compound represented by the general formula (2), in which a content of the compound represented by the general formula (2) in the optical composition is 1.0 mass % or more and 10.0 mass % or less with respect to the compound represented by the general formula (1):

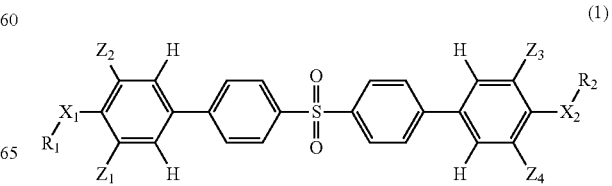

(1)

-continued (2)

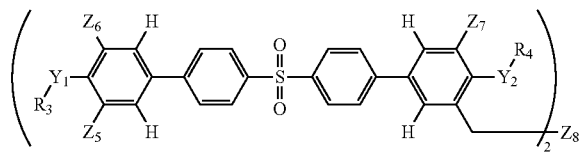

in the general formula (1) and the general formula (2):

$X_1$, $X_2$, $Y_1$, and $Y_2$ each represent O or S, and may be identical to or different from one another;

$R_1$ to $R_4$ each represent one selected from the group consisting of a methyl group, an ethyl group, a propyl group, an isopropyl group, an allyl group, a 2-(meth)acryloyloxyethyl group, a 3-(meth)acryloyloxypropyl group, and a 4-(meth)acryloyloxybutyl group, and may be identical to or different from one another;

$Z_1$, $Z_4$, and $Z_6$ each represent a structure represented by the general formula (3);

$Z_2$, $Z_3$, $Z_5$, and $Z_7$ each represent one selected from the group consisting of a hydrogen atom, a methyl group, an ethyl group, an isopropyl group, a methoxy group, an ethoxy group, an isopropoxy group, a methylthio group, an ethylthio group, a propylthio group, a 2-(meth)acryloyloxyethoxy group, a 3-(meth)acryloyloxypropoxy group, a 4-(meth)acryloyloxybutoxy group, and a structure represented by the general formula (3), and may be identical to or different from one another; and $Z_8$ represents V in a structure represented by the general formula (3);

(3)

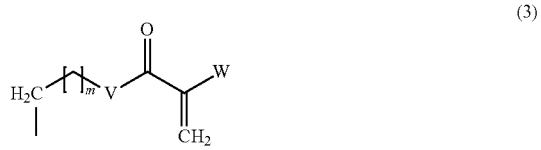

in the general formula (3), m represents 0 or 1, W represents a hydrogen atom or a methyl group, and V is selected from the group consisting of the following substituents:
*—O—**;
*—S—**;
*—O—$C_nH_{2n}$—O—**;
*—S—$C_nH_{2n}$—O—**;
*—O—$C_nH_{2n}$—S—**; and
*—S—$C_nH_{2n}$—S—**;

in each of the $Z_1$ to the $Z_7$, * of the structure represents a bonding hand with an alkylene moiety and ** thereof represents a bonding hand with a (meth)acryloyl group, in the $Z_8$, the V does not represent *—O—** and *—S—**, and both of * and ** each represent a bonding hand with an alkylene moiety, and a structure represented by $C_nH_{2n}$ in the V may have a substituent on a carbon atom, and n represents an integer selected from the group consisting of 2 to 5.

A cured product that solves the problems is a cured product, which is obtained by polymerizing the optical composition, the cured product containing at least a structure represented by the general formula (4) and a structure represented by the general formula (5), in which a content of the structure represented by the general formula (5) in the cured product is 0.01 or more and 0.10 or less in terms of a substance amount ratio with respect to the structure represented by the general formula (4):

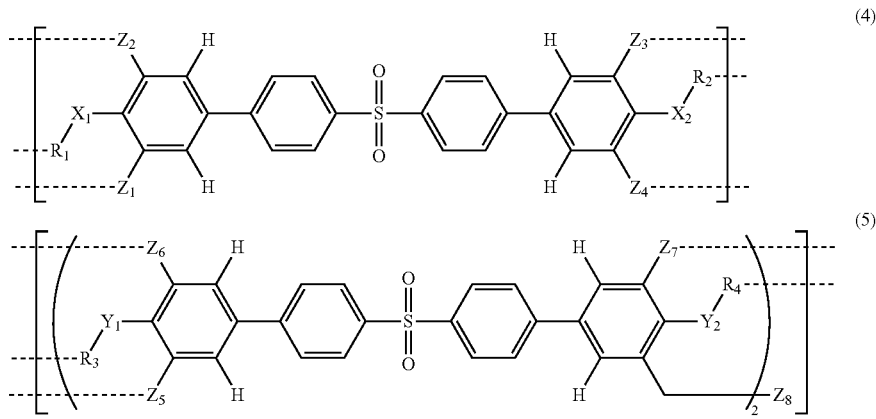

in the general formula (4) and the general formula (5):

$X_1$, $X_2$, $Y_1$, and $Y_2$ each represent O or S, and may be identical to or different from one another;

$R_1$ to $R_4$ each represent one selected from the group consisting of a methyl group, an ethyl group, a propyl group, an isopropyl group, an allyl group, a 2-(meth)acryloyloxyethyl group, a 3-(meth)acryloyloxypropyl group, and a 4-(meth)acryloyloxybutyl group, and may be identical to or different from one another;

when the $R_1$ to the $R_4$ each represent an allyl group, a 2-(meth)acryloyloxyethyl group, a 3-(meth)acryloyloxypropyl group, or a 4-(meth)acryloyloxybutyl group, the $R_1$ to the $R_4$ may each represent a group having a bond formed with a cleaved double bond of the allyl group, the 2-(meth)acryloyloxyethyl group, the 3-(meth)acryloyloxypropyl group, or the 4-(meth)acryloyloxybutyl group;

$Z_1$, $Z_4$, and $Z_6$ may each represent a structure represented by the general formula (3) or a structure having a bond formed with a cleaved double bond of a structure represented by the general formula (3);

$Z_2$, $Z_3$, $Z_5$, and $Z_7$ each represent one selected from the group consisting of a hydrogen atom, a methyl group, an ethyl group, an isopropyl group, a methoxy group, an ethoxy group, an isopropoxy group, a methylthio group, an ethylthio group, a propylthio group, a 2-(meth)acryloyloxyethoxy group, a 3-(meth)acryloyloxypropoxy group, a 4-(meth)acryloyloxybutoxy group, and a structure represented by the general formula (3), and may be identical to or different from one another;

when the $Z_2$, the $Z_3$, the $Z_5$, and the $Z_7$ each represent a 2-(meth)acryloyloxyethoxy group, a 3-(meth)acryloyloxypropoxy group, a 4-(meth)acryloyloxybutoxy group, or a structure represented by the general formula (3), the $Z_2$, the $Z_3$, the $Z_5$, and the $Z_7$ may each represent a structure having a bond formed with a cleaved double bond of the 2-(meth)acryloyloxyethoxy group, the 3-(meth)acryloyloxypropoxy group, the 4-(meth)acryloyloxybutoxy group, or the structure represented by the general formula (3);

at least two broken lines in the general formula (4) or the general formula (5) each represent the bond formed with the cleaved double bond; and $Z_8$ represents V in a structure represented by the general formula (3);

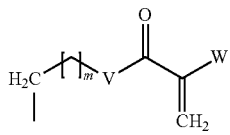

(3)

in the general formula (3), m represents 0 or 1, W represents a hydrogen atom or a methyl group, and V is selected from the group consisting of the following structures:

\*—O—\*\*;
\*—S—\*\*;
\*—O—$C_nH_{2n}$—O—\*\*;
\*—S—$C_nH_{2n}$—O—\*\*;
\*—O—$C_nH_{2n}$—S—\*\*; and
\*—S—$C_nH_{2n}$—S—\*\*;

in each of the $Z_1$ to the $Z_7$, \* of the structure represents a bonding hand with an alkylene moiety and \*\* of the structure represents a bonding hand with a (meth)acryloyl group, in the $Z_8$, the V does not represent \*—O—\*\* and \*—S—\*\*, and both of \* and \*\* each represent a bonding hand with an alkylene moiety, and a structure represented by $C_nH_{2n}$ in the V may have a substituent on a carbon atom, and n represents an integer selected from the group consisting of 2 to 5.

An optical element that solves the problems is an optical element obtained by molding the cured product.

According to the present invention, the optical composition having the following features and the cured product obtained by polymerizing the optical composition, and the optical element using the cured product can be provided: the dispersion characteristic (Abbe number ($v_d$)) and secondary dispersion characteristic (θg,F) of refractive indices are high, and the crystallization of an organic material can be suppressed to an extent larger than that in the related art. In addition, a difference in refractive index characteristic between a cured product of an optical composition that does not use the present invention and the cured product of the optical composition of the present invention is sufficiently small in terms of optical design. Accordingly, according to the optical composition of the present invention that can suppress the occurrence of a nonuniform portion occurring at the time of crystallization, its storage stability can be improved without any change in terms of optical design.

Further features of the present invention will become apparent from the following description of exemplary embodiments with reference to the attached drawings.

DESCRIPTION OF THE EMBODIMENTS

Figure 1:
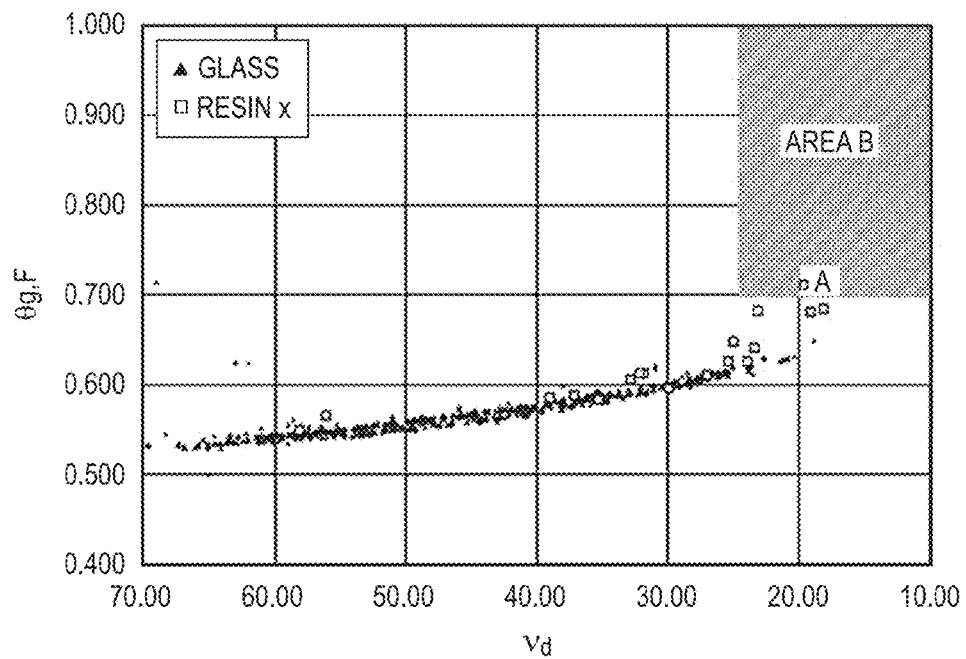
FIG. 1 is a graph for showing a relationship between secondary dispersion characteristic and Abbe number of a conventional optical material.

Preferred embodiments of the present invention will now be described in detail in accordance with the accompanying drawings.

The present invention is described in detail below.

First, an optical composition of the present invention is described.

An optical composition of the present invention includes at least a compound represented by the general formula (1) and a compound represented by the general formula (2), in which a content of the compound represented by the general formula (2) in the optical composition is 1.0 mass % or more and 10.0 mass % or less with respect to the compound represented by the general formula (1).

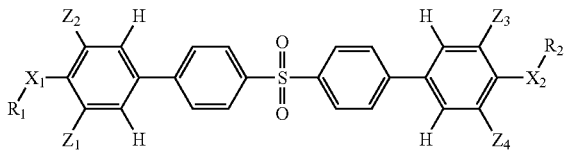

(1)

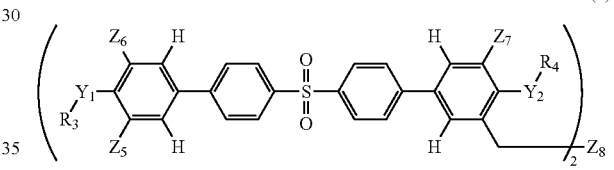

(2)

In the compound represented by the general formula (1) and the compound represented by the general formula (2), as long as $X_1$, $X_2$, $Y_1$, and $Y_2$ each represent an electron-donating element, the $X_1$, the $X_2$, the $Y_1$, and the $Y_2$ are not particularly limited because the dispersion characteristic and secondary dispersion characteristic of the optical composition become characteristics within an area where an effect in terms of optical design is obtained. However, in consideration of, for example, the environmental durability and ease of synthesis of each of the compounds, the $X_1$, the $X_2$, the $Y_1$, and the $Y_2$ each represent an oxygen atom (O) or a sulfur atom (S), and may be identical to or different from one another; provided that it is preferred that the $X_1$ and the $X_2$ be identical to each other, and the $Y_1$ and the $Y_2$ be identical to each other in consideration of the ease of synthesis of each of the compounds and the ease with which the compound represented by the general formula (2) is incorporated at 1.0 mass % or more and 10.0 mass % or less into the compound represented by the general formula (1). It is more preferred that the $X_1$, the $X_2$, the $Y_1$, and the $Y_2$ each represent O.

In the compound represented by the general formula (1) and the compound represented by the general formula (2), substituents represented by $R_1$ to $R_4$ are not particularly limited as long as the substituents can be stably bonded to the $X_1$, the $X_2$, the $Y_1$, and the $Y_2$, respectively. Atoms to be bonded to the $X_1$, the $X_2$, the $Y_1$, and the $Y_2$ are preferably carbon atoms. As the molecular weights of the substituents represented by the $R_1$ to the $R_4$ increase, the dispersion characteristic and secondary dispersion characteristic of the optical composition reduce. Accordingly, the molecular weights of the substituents are preferably less than 170. Specific examples of the substituents represented by the $R_1$ to the $R_4$ may include, but not limited to, a methyl group, an ethyl group, a propyl group, an isopropyl group, a tert-butyl group, an isobutyl group, a chloromethyl group, a bromomethyl group, a dichloromethyl group, a trichloromethyl group, a fluoromethyl group, a difluoromethyl group, a trifluoromethyl group, a pentyl group, an allyl group, a 2-(meth)acryloyloxyethyl group, a 3-(meth)acryloyloxypropyl group, and a 4-(meth)acryloyloxybutyl group. Of those, a methyl group, an ethyl group, a propyl group, an isopropyl group, an allyl group, a 2-(meth)acryloyloxyethyl group, a 3-(meth)acryloyloxypropyl group, and a 4-(meth)acryloyloxybutyl group are preferred. A methyl group, an ethyl group, a propyl group, and an isopropyl group are more preferred. In addition, the substituents represented by the $R_1$ to the $R_4$ may be identical to or different from one another. However, it is preferred that the $R_1$ and the $R_2$ represent the same substituent, and the $R_3$ and the $R_4$ represent the same substituent in consideration of the ease of synthesis of each of the compounds and the ease with which the compound represented by the general formula (2) is incorporated at 1.0 mass % or more and 10.0 mass % or less into the compound represented by the general formula (1). In addition, in order that a production cost for the optical composition may be reduced, it is desired that the $R_1$ and the $R_2$ represent the same substituent, and the $R_3$ and the $R_4$ represent the same substituent, and any such substituent is specifically a methyl group, an ethyl group, a propyl group, or an isopropyl group. In consideration of the dispersion characteristic and secondary dispersion characteristic of a cured product obtained by polymerizing the composition, the substituents represented by the $R_1$ to the $R_4$ are each more preferably a methyl group or an isopropyl group. When the molecular weights of the substituents represented by the $R_1$ to the $R_4$ are close to 170, the dispersion characteristic and secondary dispersion characteristic of the cured product of the optical composition containing the compound represented by the general formula (1) and the compound represented by the general formula (2) reduce, and hence an effect exhibited when the cured product is used as an optical element reduces. Accordingly, the purity of the optical composition is preferably increased to as high a value as possible. A recrystallization method is desirably used as a method of increasing the purity because the amount of a residual solvent and the like in the compounds can be reduced.

In the compound represented by the general formula (1) and the compound represented by the general formula (2), substituents represented by $Z_1$, $Z_4$, and $Z_6$ are each a structure represented by the general formula (3). In addition, substituents represented by $Z_2$, $Z_3$, $Z_5$, and $Z_7$ are not particularly limited as long as the substituents are each a hydrogen atom, or a substituent bonded to a benzene ring through a carbon atom, an oxygen atom, a sulfur atom, or a nitrogen atom. However, when the molecular weights of the substituents increase, the dispersion characteristic and secondary dispersion characteristic of the optical composition of the present invention reduce. Accordingly, the molecular weights are preferably less than 200. Specific examples of the substituents represented by the $Z_2$, the $Z_3$, the $Z_5$, and the $Z_7$ may include, but not limited to, a hydrogen atom, a methyl group, an ethyl group, an isopropyl group, a chloromethyl group, a dichloromethyl group, a trichloromethyl group, a fluoromethyl group, a difluoromethyl group, a trifluoromethyl group, a methoxy group, an ethoxy group, an isopropoxy group, a chloromethyloxy group, a dichloromethyloxy group, a trichloromethyloxy group, a fluoromethyloxy group, a difluoromethyloxy group, a trifluoromethyloxy group, a methylthio group, an ethylthio group, a propylthio group, a dimethylamino group, a diethylamino group, a dipropylamino group, a 2-(meth)acryloyloxyethoxy group, a 3-(meth)acryloyloxypropoxy group, a 4-(meth)acryloyloxybutoxy group, and a structure represented by the general formula (3). In consideration of the transmittance of the cured product and prevention of the yellowing thereof in a reliability test, and the ease of synthesis of each of the compounds, the substituents represented by the $Z_2$, the $Z_3$, the $Z_5$, and the $Z_7$ are each preferably selected from the group consisting of a hydrogen atom, a methyl group, an ethyl group, an isopropyl group, a methoxy group, an ethoxy group, an isopropoxy group, a methylthio group, an ethylthio group, a propylthio group, a 2-(meth)acryloyloxyethoxy group, a 3-(meth)acryloyloxypropoxy group, a 4-(meth)acryloyloxybutoxy group, and a structure represented by the general formula (3). In further consideration of the ease of synthesis, the substituents represented by the $Z_2$, the $Z_3$, the $Z_5$, and the $Z_7$ are each more preferably selected from the group consisting of a hydrogen atom, a methyl group, an ethyl group, an isopropyl group, a methoxy group, an ethoxy group, an isopropoxy group, a methylthio group, an ethylthio group, a propylthio group, and a structure represented by the general formula (3). In consideration of the ease of synthesis, the ease of availability of raw materials for the optical composition to be used, and the production cost, the substituents represented by the $Z_2$, the $Z_3$, the $Z_5$, and the $Z_7$ are each preferably one selected from the group consisting of a hydrogen atom, a methyl group, an ethyl group, and an isopropyl group. Further, the $Z_2$, the $Z_3$, the $Z_5$, and the $Z_7$ each more preferably represent a hydrogen atom. When the molecular weights of the substituents represented by the $Z_2$, the $Z_3$, the $Z_5$, and the $Z_7$ are close to 200, the dispersion characteristic and secondary dispersion characteristic of the cured product of the optical composition containing the compound represented by the general formula (1) and the compound represented by the general formula (2) reduce, and hence the effect exhibited when the cured product is used as an optical element reduces. Accordingly, the purity of the optical composition is preferably increased to as high a value as possible. The recrystallization method is desirably used as a method of increasing the purity because the amount of the residual solvent and the like in the compounds can be reduced.

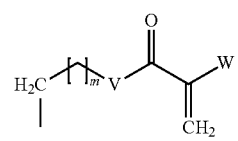

(3)

In a structure represented by the general formula (3), m is not particularly limited as long as the molecular weights of the Z's do not exceed 200. However, the m represents 0 or 1 in consideration of the ease of synthesis and the ease with which the compound represented by the general formula (2) is incorporated at 1.0 mass % or more and 10.0 mass % or less into the compound represented by the general formula (1), and the m preferably represents 0 in consideration of the ease of synthesis. In the structure represented by the general formula (3), W represents a hydrogen atom or a methyl group, and V is not particularly limited as long as the molecular weights of the Z's do not exceed 200. However, in consideration of the ease of synthesis, the ease with which the compound represented by the general formula (2) is incorporated at 1.0 mass % or more and 10.0 mass % or less into the compound represented by the general formula (1), and the ease with which the purity is increased, the V is selected from the group consisting of the following groups:

\*—O—\*\*;
\*—S—\*\*;
\*—O—$C_nH_{2n}$—O—\*\*;
\*—S—$C_nH_{2n}$—O—\*\*;
\*—O—$C_nH_{2n}$—S—\*\*; and
\*—S—$C_nH_{2n}$—S—\*\*.

In the groups, \* represents a bonding hand with an alkylene moiety, \*\* represents a bonding hand with a (meth)acryloyl group, and n represents one integer selected from the group consisting of 2 to 5. In a structure represented by $C_nH_{2n}$ in the V, a substituent, such as a halogen atom, an alkyl group, an aromatic group, or a reactive functional group, may be present on a carbon atom. In consideration of the ease of synthesis, and the dispersion characteristic and secondary dispersion characteristic of the cured product, the V preferably represents any one of the following structures:

\*—O—\*\*;
\*—S—\*\*;
\*—O—$CH_2CH_2$—O—\*\*;
\*—O—$CH_2CH_2CH_2$—O—\*\*;
\*—O—$CH_2CH_2CH_2CH_2$—O—\*\*;
\*—O—$CH_2CH_2CH_2CH_2CH_2$—O—\*\*;
\*—O—$CH_2C(CH_3)_2CH_2$—O—\*\*;
\*—O—$CH_2CH(CH_3)CH_2$—O—\*\*;
\*—O—$CH(CH_3)CH_2CH(CH_3)$—O—\*\*;
\*—O—$C(CH_3)_2CH_2CH_2$—O—\*\*;
\*—O—$CH_2CH_2C(CH_3)_2$—O—\*\*;
\*—S—$CH_2CH_2$—O—\*\*;
\*—S—$CH_2CH_2CH_2$—O—\*\*;
\*—S—$CH_2CH_2CH_2CH_2$—O—\*\*;
\*—S—$CH_2CH_2CH_2CH_2CH_2$—O—\*\*;
\*—S—$CH_2C(CH_3)_2CH_2$—O—\*\*;
\*—S—$CH_2CH(CH_3)CH_2$—O—\*\*;
\*—S—$CH(CH_3)CH_2CH(CH_3)$—O—\*\*;
\*—S—$C(CH_3)_2CH_2CH_2$—O—\*\*;
\*—S—$CH_2CH_2C(CH_3)_2$—O—\*\*;
\*—O—$CH_2CH_2$—S—\*\*;
\*—O—$CH_2CH_2CH_2$—S—\*\*;
\*—O—$CH_2CH_2CH_2CH_2$—S—\*\*;
\*—O—$CH_2CH_2CH_2CH_2CH_2$—S—\*\*;
\*—O—$CH_2C(CH_3)_2CH_2$—S—\*\*;
\*—O—$CH_2CH(CH_3)CH_2$—S—\*\*;
\*—O—$CH(CH_3)CH_2CH(CH_3)$—S—\*\*;
\*—O—$C(CH_3)_2CH_2CH_2$—S—\*\*;
\*—O—$CH_2CH_2C(CH_3)_2$—S—\*\*;
\*—S—$CH_2CH_2$—S—\*\*;
\*—S—$CH_2CH_2CH_2$—S—\*\*;
\*—S—$CH_2CH_2CH_2CH_2$—S—\*\*;
\*—S—$CH_2CH_2CH_2CH_2CH_2$—S—\*\*;
\*—S—$CH_2C(CH_3)_2CH_2$—S—\*\*;
\*—S—$CH_2CH(CH_3)CH_2$—S—\*\*;
\*—S—$CH(CH_3)CH_2CH(CH_3)$—S—\*\*;
\*—S—$C(CH_3)_2CH_2CH_2$—S—\*\*; and
\*—S—$CH_2CH_2C(CH_3)_2$—S—.

In consideration of the ease of synthesis, the V more preferably represents any one of the following structures:

\*—O—\*\*;
\*—S—\*\*;
\*—O—$CH_2CH_2$—O—\*\*;
\*—O—$CH_2CH_2CH_2$—O—\*\*;
\*—O—$CH_2CH_2CH_2CH_2$—O—\*\*;
\*—O—$CH_2CH_2CH_2CH_2CH_2$—O—\*\*;
\*—O—$CH_2C(CH_3)_2CH_2$—O—\*\*;
\*—O—$CH_2CH(CH_3)CH_2$—O—\*\*;
\*—O—$CH(CH_3)CH_2CH(CH_3)$—O—\*\*;
\*—S—$CH_2CH_2$—O—\*\*;
\*—S—$CH_2CH_2CH_2$—O—\*\*;
\*—S—$CH_2CH_2CH_2CH_2$—O—\*\*;
\*—S—$CH_2CH_2CH_2CH_2CH_2$—O—\*\*;
\*—S—$CH_2C(CH_3)_2CH_2$—O—\*\*;
\*—S—$CH_2CH(CH_3)CH_2$—O—\*\*;
\*—S—$CH(CH_3)CH_2CH(CH_3)$—O—\*\*;
\*—O—$CH_2CH_2$—S—\*\*;
\*—O—$CH_2CH_2CH_2$—S—\*\*;
\*—O—$CH_2CH_2CH_2CH_2$—S—\*\*;
\*—O—$CH_2CH_2CH_2CH_2CH_2$—S—\*\*;
\*—O—$CH_2C(CH_3)_2CH_2$—S—\*\*;
\*—O—$CH_2CH(CH_3)CH_2$—S—\*\*;
\*—O—$CH(CH_3)CH_2CH(CH_3)$—S—\*\*;
\*—S—$CH_2CH_2$—S—\*\*;
\*—S—$CH_2CH_2CH_2$—S—\*\*;
\*—S—$CH_2CH_2CH_2CH_2$—S—\*\*;
\*—S—$CH_2CH_2CH_2CH_2CH_2$—S—\*\*;
\*—S—$CH_2C(CH_3)_2CH_2$—S—\*\*;
\*—S—$CH_2CH(CH_3)CH_2$—S—\*\*; and
\*—S—$CH(CH_3)CH_2CH(CH_3)$—S—\*\*.

In consideration of the ease of synthesis of each of the compound represented by the general formula (1) and the compound represented by the general formula (2), in particular, the ease with which each of the compounds is purified, the V preferably represents any one of the following structures:

\*—O—\*\*;
\*—S—\*\*;
\*—O—$CH_2CH_2$—O—\*\*;
\*—O—$CH_2CH_2CH_2$—O—\*\*;
\*—O—$CH_2CH_2CH_2CH_2$—O—\*\*;
\*—O—$CH_2CH_2CH_2CH_2CH_2$—O—\*\*;
\*—O—$CH_2C(CH_3)_2CH_2$—O—\*\*;
\*—O—$CH_2CH(CH_3)CH_2$—O—\*\*;
\*—O—$CH(CH_3)CH_2CH(CH_3)$—O—\*\*;
\*—S—$CH_2CH_2$—S—\*\*;
\*—S—$CH_2CH_2CH_2$—S—\*\*;
\*—S—$CH_2CH_2CH_2CH_2$—S—\*\*;
\*—S—$CH_2CH_2CH_2CH_2CH_2$—S—\*\*;
\*—S—$CH_2C(CH_3)_2CH_2$—S—\*\*;
\*—S—$CH_2CH(CH_3)CH_2$—S—\*\*; and
\*—S—$CH(CH_3)CH_2CH(CH_3)$—S—\*\*.

In consideration of, for example, the production cost, the odor of a reagent, and the storage stability of each of the compounds, the V more preferably represents any one of the following structures:

\*—O—\*\*;
\*—S—\*\*;
\*—O—$CH_2CH_2$—O—\*\*;
\*—O—$CH_2CH_2CH_2$—O—\*\*;
\*—O—$CH_2CH_2CH_2CH_2$—O—\*\*;
\*—O—$CH_2CH_2CH_2CH_2CH_2$—O—\*\*;
\*—O—$CH_2C(CH_3)_2CH_2$—O—\*\*;
\*—S—$CH_2CH_2$—S—\*\*;
\*—S—$CH_2CH_2CH_2$—S—\*\*;
\*—S—$CH_2CH_2CH_2CH_2$—S—\*\*; and
\*—S—$CH_2C(CH_3)_2CH_2$—S—\*\*.

Although $Z_8$ is not particularly limited as long as the $Z_8$ represents a structure that can achieve the effects of the present invention, in consideration of the ease of synthesis, the $Z_8$ desirably represents a structure represented by the V in a structure represented by the general formula (3). In this case, however, the $Z_8$ does not represent *—O—** and *—S—**, and both of * and ** each represent a bonding hand with an alkylene moiety. Further, the $Z_8$ preferably represents the same structure as that represented by the V in the structure represented by the general formula (3) of the $Z_6$ in consideration of the ease of synthesis and the ease with which the compound represented by the general formula (2) is incorporated into the optical composition at 1.0 mass % or more and 10.0 mass % or less with respect to the compound represented by the general formula (1). Still further, it is more preferred that in the compound represented by the general formula (1) and the compound represented by the general formula (2), structures represented by the V's in the structures each represented by the general formula (3), the structures serving as the $Z_1$, the $Z_4$, and the $Z_6$, and the structure represented by the $Z_8$ be identical to one another in order that the effects of the optical composition of the present invention may be exhibited.

Next, an effect of incorporating the compound represented by the general formula (2) into the compound represented by the general formula (1) in the optical composition of the present invention is described. In general, a polymerization inhibitor for suppressing the polymerization of a polymerizable material is added to an optical composition stored in a storage bottle. However, when the polymerizable material crystallizes, the polymerization inhibitor cannot be present near a molecule of the polymerizable material in a crystalline state, and hence the polymerizable material is more liable to polymerize. Meanwhile, unlike polymerization in a liquid state, polymerization in the crystalline state is polymerization in a crystal unit, and hence there is a low risk of the polymerization of the contents in the entirety of the storage bottle. A polymer obtained by the polymerization of the crystal of the polymerizable material has a low solubility in the optical composition, and hence deteriorates a scattering ratio in the cured product obtained by polymerizing the optical composition. In addition, the polymer serves as one factor for a reduction in quality of the optical composition because the polymer is identified as foreign matter.

In addition, when the crystallization of the polymerizable material advances in an optical composition in the state of a mixture having added thereto various additives, a nonuniform portion in which the polymerization inhibitor and the additives concentrate occurs in the optical composition to serve as one factor for the reduction in quality of the optical composition. The occurrence of the nonuniform portion becomes a problem in terms of process management because the occurrence requires an additional step, such as re-stirring.

Meanwhile, a typical method of suppressing the crystallization of the polymerizable material is, for example, a method involving adding a material having a high dissolving power, or a method involving adding a molecule that hardly crystallizes, the molecule having a molecular structure similar to that of a molecule of the polymerizable material whose crystallization is to be suppressed, to inhibit the orientation of the molecule of the polymerizable material that advances at the time of the crystallization. In the former method, the material having a high dissolving power needs to be added in a large amount for obtaining the effect. In the method, changes in optical characteristics of the cured product obtained by curing the optical composition may become problems, though the crystallization of the polymerizable material can be suppressed. In the latter method, as disclosed in Japanese Patent Application Laid-Open No. 2014-198814, a method involving adding a molecule that more hardly crystallizes, the molecule having a molecular structure similar to that of the molecule of the polymerizable material whose crystallization is to be suppressed, is general.

The molecule that more hardly crystallizes, the molecule having the similar molecular structure, is specifically, for example, a molecule obtained by the addition of a flexible substituent having a long carbon chain to the molecular skeleton of the polymerizable material serving as a base or a change of a substituent of the material into a substituent having a carbon chain longer than the molecule whose crystallization is to be suppressed.

However, concern is raised in that the dispersion characteristic and secondary dispersion characteristic of an optical composition containing a compound having a structure similar to that of the polymerizable material, the compound being obtained by performing the addition of the flexible substituent or the change into the substituent having the longer carbon chain, reduce. Accordingly, in the present invention, the compound represented by the general formula (2) having crystallinity higher than that of the compound represented by the general formula (1) is incorporated into the compound represented by the general formula (1). With regard to the content of the compound represented by the general formula (2), when the content is excessively small, a crystallization-suppressing effect is small, and when the content is excessively large, the crystallization of the compound represented by the general formula (2) is accelerated. Accordingly, the content of the compound represented by the general formula (2) in the optical composition of the present invention is preferably 1.0 mass % or more and 10.0 mass % or less with respect to the compound represented by the general formula (1). This case is desired because the crystallization-suppressing effect of the compound represented by the general formula (1) becomes suitable and the crystallization of the compound represented by the general formula (2) can be suppressed. The content is more preferably 3.0 mass % or more and 8.0 mass % or less. This case is desired because the crystallization-suppressing effect of the compound represented by the general formula (1) becomes more suitable and the crystallization of the compound represented by the general formula (2) can be suppressed to a larger extent, and hence the crystallization-suppressing effect is expressed in a wide temperature range.

Next, a method of producing the compound represented by the general formula (1) is described by way of an example. A production route for the compound represented by the general formula (1) is not particularly limited, and any production method can be adopted; provided that the production method includes at least the following synthesis steps (a), (b), and (c):

(a) a step of forming an aromatic ring (benzene ring)-aromatic ring bond;
(b) an etherification (thioetherification) step; and
(c) a step of introducing a (meth)acryloyl group.

In consideration of, for example, the ease of synthesis, the synthesis steps are performed in the following order: the step (a), the step (b), and the step (c).

In the step (a), a bond-forming reaction can be appropriately changed in accordance with the kind of functional group that an aromatic ring has. Examples thereof include a coupling reaction based on a transition metal catalyst, an oxidative coupling reaction between halides, and a substitution reaction on an aromatic ring. In consideration of the yield of the reaction, the coupling reaction based on the transition metal catalyst is desired.

The coupling reaction based on the transition metal catalyst can be selected in accordance with the kind of functional group that an aromatic ring has. A typical method therefor is, for example, the Suzuki coupling involving utilizing boric acid or the like, the Stille coupling involving utilizing an organotin, or the Negishi coupling involving utilizing an organozinc.

A typical method for an etherification reaction in the step (b) is, for example, a Williamson ether synthesis method involving turning a hydroxy group into a salt with sodium hydride, potassium hydroxide, or the like, and then adding a corresponding halide. Meanwhile, a thioetherification reaction is performed in two steps, i.e., a thiol group-producing reaction, and a reaction between a thiol group and a halide. Here, the thiol group-producing reaction is achieved by, for example, transforming a hydroxy group into a substituent having activity for a nucleophilic substitution reaction (e.g., TsO—, Cl—, or $CF_3S(=O)_2$—O—), and then performing a nucleophilic substitution reaction involving using a sulfide ion ($S^{2-}$). In addition, in the reaction between the thiol group and the halide, the above-mentioned Williamson ether synthesis method or the like can be applied. In each of the etherification reaction and the thioetherification reaction, water management needs to be strictly performed because when moisture is included in a reaction condition, a side reaction advances to produce an alcohol form or a thiol form as a by-product.

In the step (c), a typical method for the introduction of a (meth)acryloyl group is, for example, a method involving esterifying a hydroxy group with a (meth)acrylic acid halide or (meth)acrylic anhydride, an ester exchange method involving using a lower alcohol ester of (meth)acrylic acid, a method involving performing esterification between a hydroxy group and (meth)acrylic acid through the use of a dehydration condensation agent, such as N,N'-dicyclohexylcarbodiimide, or a method involving heating (meth)acrylic acid in the presence of a dehydrating agent, such as sulfuric acid, to esterify a hydroxy group.

In addition, a polymerization inhibitor may be used as required so that the polymerization of the compound represented by the general formula (1) may not advance at the time of a reaction for the production of the compound, at the time of its purification, or at the time of its storage. Examples of the polymerization inhibitor include: hydroquinones, such as p-benzoquinone, hydroquinone, hydroquinone monomethyl ether, hydroquinone monoethyl ether, hydroquinone monopropyl ether, hydroquinone monobutyl ether, hydroquinone monopentyl ether, hydroquinone monohexyl ether, hydroquinone monooctyl ether, hydroquinone monoheptyl ether, and 2,5-diphenyl-p-benzoquinone; N-oxy radicals, such as tetramethylpiperidinyl-N-oxy radical (TEMPO); substituted catechols, such as tert-butylcatechol; amines, such as phenothiazine, diphenylamine, and phenyl-β-naphthylamine; nitrosobenzene; picric acid; molecular oxygen; sulfur; and copper(II) chloride. Of those, hydroquinones, phenothiazine, and N-oxyradicals are preferred from the viewpoints of a general-purpose property and the suppression of the polymerization.

A lower limit for the usage amount of the polymerization inhibitor is typically 10 ppm or more, preferably 50 ppm or more with respect to the compound represented by the general formula (1), and an upper limit therefor is typically 10,000 ppm or less, preferably 5,000 ppm or less with respect thereto. In the case where the usage amount of the polymerization inhibitor is excessively small, i.e., less than 10 ppm, the following risk arises: the effect of the polymerization inhibitor is not expressed or the effect is small, and hence the polymerization advances at the time of the reaction or at the time of condensation in a posttreatment step. In addition, the case where the usage amount of the polymerization inhibitor is more than 10,000 ppm is not preferred because the following risk arises: the polymerization inhibitor serves as, for example, an impurity at the time of the production of a cured product to be described later, and has an adverse effect, such as the inhibition of the polymerization reactivity of the compound.

Meanwhile, with regard to a method of producing the compound represented by the general formula (2) in the present invention, as in the compound represented by the general formula (1), a production route therefor is not particularly limited, and its production is performed by the same method as the method of producing the compound represented by the general formula (1); provided that the equivalent and addition time of a reagent to be used need to be changed in order that the basic skeleton of the compound represented by the general formula (2) may be obtained in the etherification (thioetherification) reaction of the step (b). In addition, a diol compound serving as a precursor of the compound represented by the general formula (2) may be synthesized as a mixture with a diol compound serving as a precursor of the compound represented by the general formula (1). Its content can be identified by, for example, NMR or liquid chromatography. When the content of the diol compound serving as the precursor of the compound represented by the general formula (2) in the mixture is from 1.0 mass % to 10.0 mass % with respect to the diol compound serving as the precursor of the compound represented by the general formula (1), the optical composition of the present invention can be obtained by subjecting the precursors in the mixture to the introduction of a (meth)acryloyl group of the step (c) to be described later. In addition, the optical composition of the present invention may be obtained by purifying and isolating the diol compound serving as the precursor of the compound represented by the general formula (2), then performing a (meth)acrylation reaction, and mixing the resultant with the compound represented by the general formula (1). The diol compound serving as the precursor of the compound represented by the general formula (1) and the diol compound serving as the precursor of the compound represented by the general formula (2) can be separately produced by adjusting the usage amount of a diol or a dithiol to be used in the etherification reaction or thioetherification reaction of the step (b).

Next, a cured product of the present invention is described.

A cured product of the present invention is a cured product, which is obtained by polymerizing the optical composition of the present invention, the cured product containing at least a structure represented by the general formula (4) and a structure represented by the general formula (5), in which a content of the structure represented by the general formula (5) in the cured product is 0.01 or more and 0.10 or less in terms of a substance amount ratio with respect to the structure represented by the general formula (4).

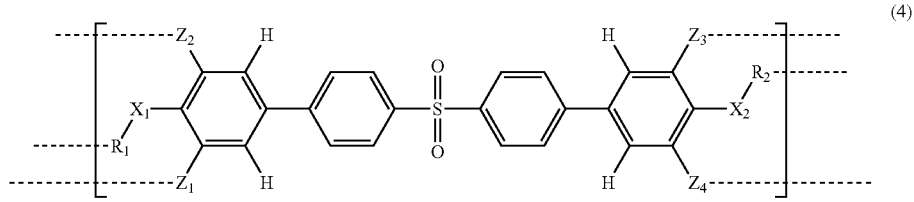

(4)

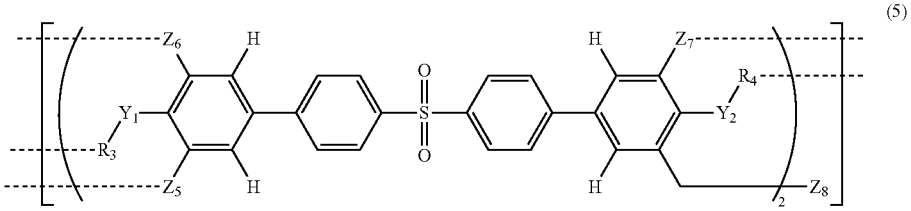

In the general formula (4) and the general formula (5), $X_1$, $X_2$, $Y_1$, and $Y_2$, $R_1$ to $R_4$, and $Z_1$ to $Z_8$ are defined in the same manner as in the $X_1$, the $X_2$, the $Y_1$, and the $Y_2$, the $R_1$ to the $R_4$, and the $Z_1$ to the $Z_8$ in the general formula (1) and the general formula (2) described above. Here, when the $R_1$ to the $R_4$ each represent an allyl group, a 2-(meth)acryloyloxyethyl group, a 3-(meth)acryloyloxypropyl group, or a 4-(meth)acryloyloxybutyl group, the $R_1$ to the $R_4$ in the general formula (4) and the general formula (5) may each represent a group in which a double bond of an allyl group, a 2-(meth)acryloyloxyethyl group, a 3-(meth)acryloyloxypropyl group, or a 4-(meth)acryloyloxybutyl group is cleaved to be bonded to another structure represented by the general formula (4) or another structure represented by the general formula (5) through the broken line. In addition, the $Z_1$, the $Z_4$, and the $Z_6$ in the general formula (4) and the general formula (5) may each represent a group in which a double bond of the structure represented by the general formula (3) is cleaved to be bonded to another structure represented by the general formula (4) or another structure represented by the general formula (5) through the broken line. Further, when the $Z_2$, the $Z_3$, the $Z_5$, and the $Z_7$ each represent a 2-(meth)acryloyloxyethoxy group, a 3-(meth)acryloyloxypropoxy group, a 4-(meth)acryloyloxybutoxy group, or the structure represented by the general formula (3), the $Z_2$, the $Z_3$, the $Z_5$, and the $Z_7$ in the general formula (4) and the general formula (5) may each represent a group in which a double bond of the 2-(meth)acryloyloxyethoxy group, the 3-(meth)acryloyloxypropoxy group, the 4-(meth)acryloyloxybutoxy group, or the structure represented by the general formula (3) is cleaved to be bonded to another structure represented by the general formula (4) or another structure represented by the general formula (5) through the broken line. In addition, at least two broken lines in the general formula (4) or the general formula (5) each represent a bond.

That is, the cured product of the present invention is a cured product obtained by polymerizing an optical composition containing at least a compound represented by the general formula (1) and a compound represented by the general formula (2), in which a content of the compound represented by the general formula (2) in the optical composition is from 1.0 mass % to 10.0 mass % with respect to the compound represented by the general formula (1).

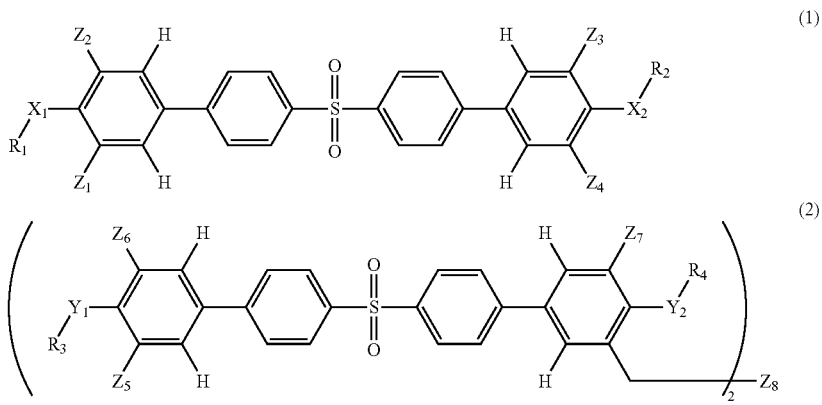

In addition, a method of producing a cured product of the present invention is a method of producing a cured product, including: preparing an optical composition containing at least a compound represented by the general formula (1) and a compound represented by the general formula (2), in which a content of the compound represented by the general formula (2) in the optical composition is 1.0 mass % or more and 10.0 mass % or less with respect to the compound represented by the general formula (1); and polymerizing the optical composition to cure the composition:

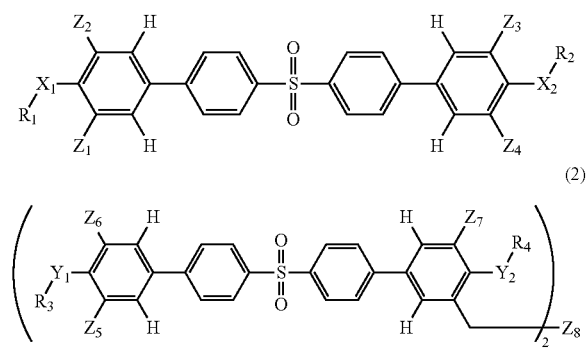

in the general formula (1) and the general formula (2):
$X_1$, $X_2$, $Y_1$, and $Y_2$ each represent O or S, and may be identical to or different from one another;

$R_1$ to $R_4$ each represent one selected from the group consisting of a methyl group, an ethyl group, a propyl group, an isopropyl group, an allyl group, a 2-(meth)acryloyloxyethyl group, a 3-(meth)acryloyloxypropyl group, and a 4-(meth)acryloyloxybutyl group, and may be identical to or different from one another;

$Z_1$, $Z_4$, and $Z_6$ may each represent a structure represented by the general formula (3);

$Z_2$, $Z_3$, $Z_5$, and $Z_7$ each represent one selected from the group consisting of a hydrogen atom, a methyl group, an ethyl group, an isopropyl group, a methoxy group, an ethoxy group, an isopropoxy group, a methylthio group, an ethylthio group, a propylthio group, a 2-(meth)acryloyloxyethoxy group, a 3-(meth)acryloyloxypropoxy group, a 4-(meth)acryloyloxybutoxy group, and a structure represented by the general formula (3), and may be identical to or different from one another; and $Z_8$ represents V in a structure represented by the general formula (3);

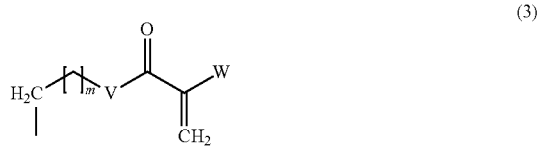

(3)

in the general formula (3), m represents 0 or 1, W represents a hydrogen atom or a methyl group, and V is selected from the group consisting of the following structures:

*—O—**;
*—S—**;
*—O—$C_nH_{2n}$—O—**;
*—S—$C_nH_{2n}$—O—**;
*—O—$C_nH_{2n}$—S—**; and
*—S—$C_nH_{2n}$—S—**;

in each of the $Z_1$ to the $Z_7$, * of the structure represents a bonding hand with an alkylene moiety and ** of the structure represents a bonding hand with a (meth)acryloyl group, in the $Z_8$, the V does not represent *—O—** and *—S—**, and both of * and ** each represent a bonding hand with an alkylene moiety, and a structure represented by $C_nH_{2n}$ in the V may have a substituent on a carbon atom, and n represents an integer selected from the group consisting of 2 to 5.

The cured product of the present invention is roughly classified into the following aspects (A) to (D):

(A) a cured product obtained by polymerizing the compound represented by the general formula (1) and the compound represented by the general formula (2);

(B) a cured product obtained by copolymerizing the compound represented by the general formula (1) and the compound represented by the general formula (2), and the other polymerizable material capable of copolymerizing with the compounds;

(C) a cured product obtained by dispersing the compound represented by the general formula (1) and the compound represented by the general formula (2) into the other polymerizable material capable of copolymerizing with the compounds, and copolymerizing the compounds and the material; and (D) a cured product obtained by dispersing the compound represented by the general formula (1) and the compound represented by the general formula (2) into the other matrix polymer, and copolymerizing the compounds.

When the cured product of the present invention is the cured product of the aspect (A), the cured product is produced by polymerizing an optical composition containing the compound represented by the general formula (1) and the compound represented by the general formula (2), and a polymerization initiator. A polymerization inhibitor, a photosensitizer, a light stabilizer, a heat stabilizer, an antioxidant, a release agent, an antifungal agent, or the like may be further incorporated into the optical composition as required.

Examples of the polymerization initiator include, but not limited to, a polymerization initiator that generates an active species, such as a radical species or a cation species, through light irradiation, and a polymerization initiator that generates an active species, such as a radical species, with heat.

Examples of the polymerization initiator that generates a radical species through light irradiation include, but not limited to, 2-benzyl-2-dimethylamino-1-(4-morpholinophenyl)-1-butanone, 1-hydroxycyclohexyl phenyl ketone, 2-hydroxy-2-methyl-1-phenyl-propan-1-one, bis(2,4,6-trimethylbenzoyl)-phenylphosphine oxide, 4-phenylbenzophenone, 4-phenoxybenzophenone, 4,4'-diphenylbenzophenone, and 4,4'-diphenoxybenzophenone.

In addition, suitable examples of the polymerization initiator that generates a cation species through light irradiation include, but not limited to, polymerization initiators such as iodonium (4-methylphenyl)[4-(2-methylpropyl)phenyl]-hexafluorophosphate.

Further, examples of the polymerization initiator that generates a radical species with heat include, but not limited to: azo compounds, such as azobisisobutylnitrile (AIBN); peroxides, such as benzoyl peroxide, tert-butyl peroxypivalate, tert-butyl peroxyneohexanoate, 1,1-dimethylbutyl peroxyneohexanoate, tert-butyl peroxyneodecanoate, 1,1-dimethylbutyl peroxyneodecanoate, cumyl peroxyneohexanoate, and cumyl peroxyneodecanoate.

The addition amount of the polymerization initiator to be incorporated into the optical composition for producing the cured product of this aspect preferably falls within the range of from 0.01 mass % or more to 10.00 mass % or less with respect to the total mass of the compound represented by the general formula (1) and the compound represented by the general formula (2). The polymerization initiators may be used alone or in combination thereof. The addition ratio of the polymerization initiator with respect to the compound represented by the general formula (1) and the compound represented by the general formula (2) may be appropriately selected in accordance with a light irradiation amount and an additional heating temperature. In addition, the addition ratio may be adjusted in accordance with the target average molecular weight of a polymer to be obtained.

Examples of the polymerization inhibitor include, but not limited to: hydroquinone monoalkyl ether-based polymerization inhibitors, such as hydroquinone monomethyl ether, hydroquinone monoethyl ether, hydroquinone monopropyl ether, hydroquinone monobutyl ether, hydroquinone monopentyl ether, hydroquinone monohexyl ether, hydroquinone monooctyl ether, and hydroquinone monoheptyl ether; and phenol-based polymerization inhibitors each having a substituent, such as 3-(3,5-di-tert-butyl-4-hydroxyphenyl)propionate. However, hydroquinone- and benzoquinone-based polymerization inhibitors are not suitable because the polymerization inhibitors may be yellowed by UV irradiation.

Examples of the polymerization inhibitor include, but not limited to, the above-mentioned examples of the polymerization inhibitor at the time of the reaction or at the time of the storage. The addition amount of the polymerization inhibitor preferably falls within the range of from 0.01 mass % or more to 1.00 mass % or less with respect to the optical composition. In addition, the polymerization initiators may be used alone or in combination thereof. In consideration of a low degree of coloring of the composition, specifically, hydroquinone monoalkyl ether-based polymerization inhibitors are preferably utilized in combination.

Examples of the photosensitizer include, but not limited to, benzophenone, 4,4-diethylaminobenzophenone, 1-hydroxycyclohexyl phenyl ketone, isoamyl p-dimethylaminobenzoate, methyl 4-dimethylaminobenzoate, benzoin, benzoin ethyl ether, benzoin isobutyl ether, benzoin isopropyl ether, 2,2-diethoxyacetophenone, methyl o-benzoylbenzoate, 2-hydroxy-2-methyl-1-phenylpropan-1-one, and acylphosphine oxides.

The light stabilizer is not particularly limited as long as the light stabilizer does not have a large influence on the optical characteristics of the cured product, and examples thereof include: benzotriazole-based compounds, such as 2-(2H-benzotriazol-2-yl)-p-cresol, 2-(2H-benzotriazol-2-yl)-4, 6-bis(1-methyl-1-phenylethyl)phenol, 2-[5-chloro (2H)-benzotriazol-2-yl]-4-methyl-6-(tert-butyl)phenol, 2-(2H-benzotriazol-2-yl)-4,6-di-tert-pentylphenol, 2-(2H-benzotriazol-2-yl)-4-(1,1,3,3-tetramethylbutyl)phenol, 2,2'-methylenebis[6-(2H-benzotriazol-2-yl)]-4-(1,1,3,3-tetramethylbutyl)phenol, and 2-(2H-benzotriazol-2-yl)-6-dodecyl-4-methylphenol; cyanoacrylate-based compounds, such as ethyl 2-cyano-3,3-diphenylacrylate and 2-ethylhexyl 2-cyano-3,3-diphenylacrylate; triazine-based compounds; and benzophenone-based compounds, such as octabenzone and 2,2'-4,4'-tetrahydrobenzophenone. The light stabilizer may also serve as the photosensitizer, and in that case, the photosensitizer may not be added.

The heat stabilizer is not particularly limited as long as the heat stabilizer does not have a large influence on the optical characteristics of the cured product, and examples thereof include: pentaerythritol tetrakis[3-(3,5-di-tert-butyl-4-hydroxyphenyl)]propionate, octadecyl-3-(3,5-di-tert-butyl-4-hydroxyphenyl)propionate, or alkyl esters of 3,5-bis(1,1-dimethylethyl)-4-hydroxybenzenepropanoic acid whose alkyl group has a side chain and consists of 7 to 9 carbon atoms; hindered phenol-based compounds, such as 4,6-bis(octylthiomethyl)-o-cresol, 4,6-bis(dodecylthiomethyl)-o-cresol, ethylenebis(oxyethylene)bis[3-(5-tert-butyl-4-hydroxy-m-tolyl)]propionate, and hexamethylenebis[3-(3,5-di-tert-butyl-4-hydroxyphenyl)]propionate; phosphorus-based compounds, such as tris(2,4-di-tert-butylphenyl) phosphite; and sulfur-based compounds, such as dioctadecyl-3,3'-thiodipropionate.

The antioxidant is not particularly limited as long as the antioxidant does not have a large influence on the optical characteristics of the cured product, and examples thereof include hindered amine-based compounds, such as bis(2,2, 6,6-tetramethyl-4-piperidyl) sebacate and bis(1,2,2,6,6-pentamethyl-4-piperidyl)[[3,5-bis(1,1-dimethylethyl)-4-hydroxyphenyl]methyl]butyl malonate.

When the cured product of the present invention is the cured product of the aspect (B), the cured product is produced by polymerizing an optical composition formed of the compound represented by the general formula (1) and the compound represented by the general formula (2), and the polymerizable material capable of copolymerizing with the compounds. The content of the compound represented by the general formula (1) and the compound represented by the general formula (2) in the optical composition is desirably 1.0 mass % or more and 99 mass % or less. In order to set the dispersion characteristic and secondary dispersion characteristic of the cured product to fall within an area useful for optical design, the content of the compound represented by the general formula (1) and the compound represented by the general formula (2) is preferably 50 mass % or more and 99 mass % or less. A polymerization inhibitor, a photosensitizer, a light stabilizer, a heat stabilizer, an antioxidant, a release agent, an antifungal agent, or the like may be further incorporated into the optical composition as required.

An example of the polymerizable material capable of copolymerizing with the compounds is, but not particularly limited to, a (meth)acrylic monomer. Examples thereof include, but not limited to: (meth)acrylate compounds, such as 1,3-adamantanediol dimethacrylate, 1,3-adamantanedimethanol dimethacrylate, tricyclodecanedimethanol diacrylate, pentaerythritol tetraacrylate, propoxylated neopentyl glycol diacrylate, dipropylene glycol diacrylate, ethoxylated bisphenol A dimethacrylate, tris(2-hydroxyethyl) isocyanurate triacrylate, 2-(2-ethoxyethoxy)ethyl acrylate, stearyl acrylate, tetrahydrofurfuryl acrylate, 2-phenoxyethyl acrylate, isodecyl acrylate, isobornyl acrylate, isobornyl methacrylate, 1,3-butylene glycol diacrylate, 1,4-butanediol diacrylate, diethylene glycol diacrylate, 1,6-hexanediol diacrylate, triethylene glycol diacrylate, tripropylene glycol diacrylate, dipropylene glycol diacrylate, triethylene glycol dimethacrylate, ethylene glycol dimethacrylate, tetraethylene glycol dimethacrylate, 1,4-butanediol dimethacrylate, diethylene glycol dimethacrylate, 1,6-hexanediol dimethacrylate, tripropylene glycol dimethacrylate, dipropylene glycol dimethacrylate, trimethylol propane trimethacrylate, 9,9-bis[4-(2-acryloyloxyethoxy)phenyl]fluorene, 9,9-bis[4-(2-methacryloyloxyethoxy)phenyl]fluorene, 9,9-bis[4-(2-acryloyloxy)phenyl]fluorene, 9,9-bis[4-(2-methacryloyloxy)phenyl]fluorene, benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, 1,1-bis(4-acryloxyethoxyphenyl)sulfone, 1,1-bis(4-methacryloxyethoxyphenyl)sulfone, 1,1-bis(4-acryloxydiethoxyphenyl)sulfone, 1,1-bis(4-methacryloxydiethoxyphenyl)sulfone, dimethylol tricyclodecane diacrylate, trimethylol propane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methyl thioacrylate, methyl thiomethacrylate, phenyl thioacrylate, benzyl thiomethacrylate, xylylene dithiol diacrylate, xylylene dithiol dimethacrylate, mercaptoethyl sulfide diacrylate, and mercaptoethyl sulfide dimethacrylate; allyl compounds, such as allyl glycidyl ether, diallyl phthalate, diallyl terephthalate, diallyl isophthalate, diallyl carbonate, and diethylene glycol bisallyl carbonate; vinyl compounds, such as styrene, chlorostyrene, methylstyrene, bromostyrene, dibromostyrene, divinylbenzene, and 3,9-divinylspirobi(m-dioxane); and diisopropenylbenzene.

The addition amount of the polymerizable material capable of copolymerizing with the compounds preferably falls within the range of from 0.10 mass % or more to 80.00 mass % or less with respect to the mass of the optical composition. The addition amount is more preferably 0.10 mass % or more and 30.00 mass % or less in consideration of the fact that the dispersion characteristic and secondary dispersion characteristic of the cured product fall within the area useful for optical design.

The polymerization initiator described in the aspect (A) can be used as a polymerization initiator to be incorporated into the optical composition for producing the cured product of this aspect. The addition amount of the polymerization initiator preferably falls within the range of from 0.01 mass % or more to 10.00 mass % or less with respect to the total mass of polymerizable components. The polymerization initiators may be used alone or in combination thereof. The addition ratio of the polymerization initiator may be appropriately selected in accordance with a light irradiation amount and an additional heating temperature. In addition, the addition ratio may be adjusted in accordance with the target average molecular weight of a polymer to be obtained.

The polymerization inhibitor described in the aspect (A) can be used as the polymerization inhibitor to be incorporated into the optical composition for producing the cured product of this aspect. The addition amount of the polymerization inhibitor preferably falls within the range of from 0.01 mass % or more to 10.00 mass % or less with respect to the optical composition.

When the polymerization is initiated by irradiation with UV light or the like, a known photosensitizer or the like can be used. The photosensitizer described in the aspect (A) can be used as the photosensitizer. The addition amount of the photosensitizer to be incorporated into the optical composition for producing the cured product of this aspect preferably falls within the range of from 0.01 mass % or more to 10.00 mass % or less with respect to the optical composition.

The light stabilizer described in the aspect (A) can be used as the light stabilizer to be incorporated into the optical composition for producing the cured product of this aspect. The addition amount of the light stabilizer preferably falls within the range of from 0.01 mass % or more to 10.00 mass % or less with respect to the optical composition.

The heat stabilizer to be incorporated into the optical composition for producing the cured product of this aspect is, for example, the heat stabilizer described in the aspect (A). The addition amount of the heat stabilizer preferably falls within the range of from 0.01 mass % or more to 10.00 mass % or less with respect to the optical composition.

The antioxidant described in the aspect (A) can be used as the antioxidant to be incorporated into the optical composition for producing the cured product of this aspect. The addition amount of the antioxidant preferably falls within the range of from 0.01 mass % or more to 10.00 mass % or less with respect to the optical composition.

When the cured product of the present invention is the cured product of the aspect (C), the cured product is produced by polymerizing an optical composition obtained by dispersing the compound represented by the general formula (1) and the compound represented by the general formula (2) into the polymerizable material capable of copolymerizing with the compounds. The content of the polymerizable material capable of copolymerizing with the compounds to be incorporated into the optical composition is desirably 1.0 mass % or more and 99.0 mass % or less. The content of the compound represented by the general formula (1) and the compound represented by the general formula (2) is preferably 1.0 mass % or more and 50.0 mass % or less in consideration of the dispersion characteristic and secondary dispersion characteristic of the cured product to be obtained, and compatibility between each of the compound represented by the general formula (1) and the compound represented by the general formula (2), and the polymerizable material.

A polymerization inhibitor, a photosensitizer, a light stabilizer, a heat stabilizer, an antioxidant, a release agent, an antifungal agent, or the like may be further incorporated into the optical composition as required.

The polymerizable material is not particularly limited as long as the dispersion characteristic and secondary dispersion characteristic of the cured product fall within an area useful for optical design. Specifically, for example, a (meth) acrylic monomer, an allyl compound, a vinyl compound, a diisopropenylbenzene compound, an epoxy compound, or a thiirane compound described in the aspect (B) can be used as the polymerizable material in this aspect, but the polymerizable material is not limited thereto.

The polymerization initiator described in the aspect (A) can be used as a polymerization initiator to be incorporated into the optical composition for producing the cured product of this aspect. The addition amount of the polymerization initiator preferably falls within the range of from 0.01 mass % or more to 10.00 mass % or less with respect to the total mass of polymerizable components. The polymerization initiators may be used alone or in combination thereof. The addition ratio of the polymerization initiator may be appropriately selected in accordance with a light irradiation amount and an additional heating temperature. In addition, the addition ratio may be adjusted in accordance with the target average molecular weight of a polymer to be obtained.

The polymerization inhibitor described in the aspect (A) can be used as the polymerization inhibitor to be incorporated into the optical composition of this aspect. The addition amount of the polymerization inhibitor preferably falls within the range of from 0.01 mass % or more to 10.00 mass % or less with respect to the optical composition.

When the polymerization is initiated by irradiation with UV light or the like, a known photosensitizer or the like can be used. The photosensitizer described in the aspect (A) can be used as a typical photosensitizer. The addition amount of the photosensitizer to be incorporated into the optical composition for producing the cured product of this aspect preferably falls within the range of from 0.01 mass % or more to 10.00 mass % or less with respect to the optical composition.

The light stabilizer described in the aspect (A) can be used as the light stabilizer to be incorporated into the optical composition for producing the cured product of this aspect. The addition amount of the light stabilizer preferably falls within the range of from 0.01 mass % or more to 10.00 mass % or less with respect to the optical composition.

The heat stabilizer described in the aspect (A) can be used as the heat stabilizer to be incorporated into the optical composition for producing the cured product of this aspect. The addition amount of the heat stabilizer preferably falls within the range of from 0.01 mass % or more to 10.00 mass % or less with respect to the optical composition.

The antioxidant described in the aspect (A) can be used as the antioxidant to be incorporated into the optical composition for producing the cured product of this aspect. The addition amount of the antioxidant preferably falls within the range of from 0.01 mass % or more to 10.00 mass % or less with respect to the optical composition.

When the cured product of the present invention is the cured product of the aspect (D), the cured product is produced by polymerizing an optical composition formed of the compound represented by the general formula (1) and the compound represented by the general formula (2), and the matrix polymer capable of copolymerizing with the compound represented by the general formula (1) and the compound represented by the general formula (2). The content of the matrix polymer compound to be incorporated into the optical composition is desirably 1.0 mass % or more and 99.0 mass % or less. The content of the matrix polymer is preferably 1.0 mass % or more and 50.0 mass % or less in consideration of the dispersion characteristic and secondary dispersion characteristic of the cured product to be obtained, and compatibility between each of the compound represented by the general formula (1) and the compound represented by the general formula (2), and the matrix polymer. A polymerization inhibitor, a photosensitizer, a light stabilizer, a heat stabilizer, an antioxidant, a release agent, an antifungal agent, or the like may be further incorporated into the optical composition as required.

Examples of the matrix polymer include, but not limited to: (meth)acrylic polymers; allyl-based polymers; polyolefin-based resins, such as an ethylene homopolymer, a random or block copolymer of ethylene and one or two or more kinds of α-olefins, such as and propylene, 1-butene, 1-pentene, 1-hexene, and 4-methyl-l-pentene, a random or block copolymer of ethylene and one or two or more kinds of vinyl acetate, acrylic acid, methacrylic acid, methyl acrylate, and methyl methacrylate, a propylene homopolymer, a random or block copolymer of propylene and one or two or more kinds of α-olefins except propylene, such as 1-butene, 1-pentene, 1-hexene, and 4-methyl-1-pentene, a 1-butene homopolymer, an ionomer resin, and a mixture of those polymers; hydrocarbon-based resins, such as a petroleum resin and a terpene resin; polyester-based resins, such as polyethylene terephthalate, polybutylene terephthalate, and polyethylene naphthalate; polyamide-based resins, such as nylon 6, nylon 66, nylon 11, nylon 12, nylon 610, nylon 6/66, nylon 66/610, and nylon MXD; acrylic resins, such as polymethyl methacrylate; styrene- or acrylonitrile-based resins, such as polystyrene, a styrene-acrylonitrile copolymer, a styrene-acrylonitrile-butadiene copolymer, and polyacrylonitrile; polyvinyl alcohol-based resins, such as polyvinyl alcohol and an ethylene-vinyl alcohol copolymer; polycarbonate resins; polyketone resins; polymethylene oxide resins; polysulfone resins; polyimide resins; and polyamide imide resins. Those resins may be used alone or as a mixture thereof. In addition, any such matrix polymer is appropriately selected in consideration of the compatibility with each of the compound represented by the general formula (1) and the compound represented by the general formula (2), and the dispersion characteristic and secondary dispersion characteristic of the cured product.

The polymerization initiator described in the aspect (A) can be used as a polymerization initiator to be incorporated into the optical composition for producing the cured product of this aspect. The addition amount of the polymerization initiator preferably falls within the range of from 0.01 mass % or more to 10.00 mass % or less with respect to the total mass of polymerizable components. The polymerization initiators may be used alone or in combination thereof. The addition ratio of the polymerization initiator may be appropriately selected in accordance with a light irradiation amount and an additional heating temperature. In addition, the addition ratio may be adjusted in accordance with the target average molecular weight of a polymer to be obtained.

The polymerization inhibitor described in the aspect (A) can be used as the polymerization inhibitor to be incorporated into the optical composition for producing the cured product of this aspect. The addition amount of the polymerization inhibitor preferably falls within the range of from 0.01 mass % or more to 10.00 mass % or less with respect to the optical composition.

When the polymerization is initiated by irradiation with UV light or the like, a known photosensitizer or the like can be used. The photosensitizer described in the aspect (A) can be used as a typical photosensitizer. The addition amount of the photosensitizer to be incorporated into the optical composition for producing the cured product of this aspect preferably falls within the range of from 0.01 mass % or more to 10.00 mass % or less with respect to the optical composition.

The light stabilizer described in the aspect (A) can be used as the light stabilizer to be incorporated into the optical composition for producing the cured product of this aspect. The addition amount of the light stabilizer preferably falls within the range of from 0.01 mass % or more to 10.00 mass % or less with respect to the optical composition.

The heat stabilizer described in the aspect (A) can be used as the heat stabilizer to be incorporated into the optical composition for producing the cured product of this aspect. The addition amount of the heat stabilizer preferably falls within the range of from 0.01 mass % or more to 10.00 mass % or less with respect to the optical composition.

The antioxidant described in the aspect (A) can be used as the antioxidant to be incorporated into the optical composition for producing the cured product of this aspect. The addition amount of the antioxidant preferably falls within the range of from 0.01 mass % or more to 10.00 mass % or less with respect to the optical composition.

A method of mixing the various additives, the general-purpose monomers, and the matrix polymer is not particularly limited as long as the materials can be uniformly mixed, and examples thereof include: a method involving mixing all the materials in a solvent or the like, and then removing the solvent; and a method involving heating the materials to melt the materials, and mixing the molten materials as they are. The method involving mixing the materials in the solvent is preferred at the time of the preparation of the optical composition for obtaining the cured product of the aspect (A), (B), or (C) because the mixture becomes uniform. Meanwhile, the method involving heating the materials and mixing the materials as they are is preferred at the time of the preparation of the optical composition for obtaining the cured product of the aspect (D) in consideration of a low solubility of the matrix polymer in a solvent.

The method involving removing the solvent is not particularly limited as long as the amount of the solvent remaining in the optical composition is small, and examples thereof include a vacuum distillation removal method and a distillation method. In the vacuum distillation removal method, the solvent is desirably removed by distillation under reduced pressure while a gas containing oxygen is flowed because the polymerization reaction may be accelerated under reduced pressure. In addition, in the distillation method, it is desired that the polymerization inhibitor be added or the heating temperature be appropriately adjusted because the polymerization reaction may be accelerated by heating.

When the optical composition of the present invention is polymerized to produce the cured product of any one of the aspects (A) to (D), the polymerization reaction is initiated by the polymerization initiator in the optical composition. When the polymerization initiator is a photopolymerization initiator that generates an active species through light irradiation, the cured product of the present invention is produced by irradiating the composition with light having a suitable wavelength with which the photopolymerization initiator generates an active species. The light having the suitable wavelength is, for example, UV light or visible light. In addition, when the polymerization initiator is a thermal polymerization initiator that generates an active species through heating, the cured product of the present invention is produced by heating the composition to a suitable temperature at which the thermal polymerization initiator generates an active species. The suitable temperature is, for example, 80° C. or more and 180° C. or less.

Next, an optical element of the present invention and a method of producing the element are described with reference to the drawings.

Figure 2A:
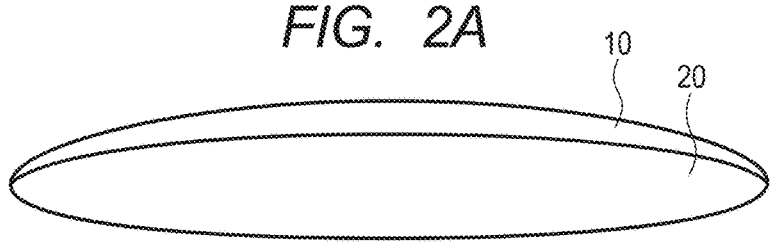
FIG. 2A and FIG. 2B are each a schematic view for illustrating an example of an optical element of the present invention.
Figure 2B:
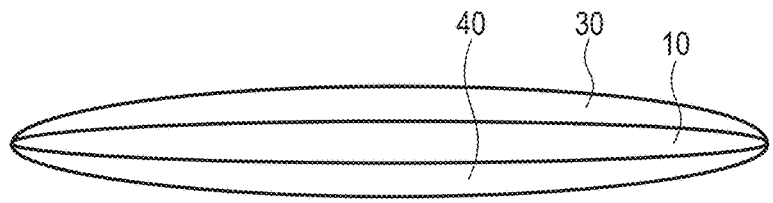

The optical element of the present invention has a feature of being obtained by molding the cured product of any one of the aspects (A) to (D). FIG. 2A and FIG. 2B are each a schematic view for illustrating an optical lens serving as an example of the optical element of the present invention. In an optical element of FIG. 2A, a thin film (optical member 10) obtained by molding and processing the cured product of the present invention is arranged on one surface of a lens substrate 20 serving as a base material. A method of producing the optical element of FIG. 2A is, for example, a method involving forming the cured product of the present invention of a layer structure having a small thickness on the base material formed of a light-transmitting material. Specifically, a mold formed of a metal material or the like is arranged so as to have a certain distance from a glass substrate, and a gap present between the mold and the glass substrate is filled with the optical composition of the present invention that is fluid. After that, molding is performed by lightly pressing down the mold. Then, the optical composition is polymerized while the mold is pressed down. The polymerization reaction is performed by light irradiation or heating.

When the polymerization of the optical composition is performed by photopolymerization, for example, raw materials for the optical composition, such as the monomers, subjected to the molding are uniformly irradiated with light through the light-transmitting material to be utilized as the substrate, specifically the glass substrate. The quantity of the irradiation light is appropriately selected in accordance with a reaction mechanism involving utilizing a photopolymerization initiator and with the content of the photopolymerization initiator to be incorporated.

In such production of the cured product of the optical composition by a photopolymerization reaction as described in the foregoing, it is preferred that the entirety of the raw materials, such as the monomers, subjected to the molding be uniformly irradiated with the irradiation light. Therefore, it is more preferred to select light having such a wavelength that the light irradiation to be utilized can be uniformly performed through the light-transmitting material to be utilized as the substrate, such as the glass substrate. At this time, a reduction in thickness of the optical composition to be formed on the substrate of the light-transmitting material is more suitable for the present invention.

In addition, when the polymerization of the optical composition is performed by thermal polymerization, the polymerization of the optical composition may be performed by heating the mold, or the polymerization of the optical composition may be performed by heating the optical composition subjected to the molding in a heating apparatus, such as an oven. A heating temperature is appropriately selected in accordance with a reaction mechanism involving utilizing a thermal polymerization initiator and with the content of the thermal polymerization initiator to be incorporated.

As in the production of the cured product of the optical composition by the photopolymerization reaction, it is preferred that heat be uniformly applied to the entirety of the raw materials for the optical composition subjected to the molding. Therefore, a heating method to be utilized more preferably involves uniformly heating the optical composition subjected to the molding in the heating apparatus. In addition, when the thickness of the cured product to be formed on the mold is reduced, even in a production method involving heating the mold to polymerize the optical composition, the optical composition can be uniformly heated.

Meanwhile, in an optical element of FIG. 2B, the thin film (optical member 10) obtained by molding and processing the cured product of the present invention is arranged between two base materials, i.e., between a lens substrate 30 and a lens substrate 40. A method of producing the optical element of FIG. 2B is, for example, as described below. The optical composition of the present invention that is uncured and the like are poured into a gap between the lens substrate 30 and the lens substrate 40, and molding is performed by lightly pressing down the composition and the like. Then, the cured product is obtained by performing the photopolymerization of the uncured optical composition while keeping the composition in the state. Thus, the optical element in which the cured product of the present invention is sandwiched between the lens substrate 30 and the lens substrate 40 can be obtained.

In addition, the cured product can be formed by a thermal polymerization method. In this case, it is desired that the temperature of the entirety of the composition be further uniformized, and a reduction in thickness of the cured product of the optical composition to be formed on the substrate of the light-transmitting material is more suitable for the optical element of the present invention.

In addition, when the thickness of the cured product to be formed is increased, the thickness of the cured product can be increased by appropriately selecting, for example, a light irradiation amount, a light irradiation intensity, and a light source taking the thickness, the absorption of light by a resin component, and the like into consideration, and a heating temperature and a heating time.

Meanwhile, when the cured product of the present invention is used as the cured product of the aspect (C), a melt molding method can be used as a method of molding the cured product. The use of the melt molding method can provide a molded product excellent in characteristics, such as low birefringence, mechanical strength, and dimensional accuracy. Examples of the melt molding method include press molding, extrusion molding, and injection molding. Of those, injection molding is preferred from the viewpoints of moldability and productivity.

In addition, a molding condition in a molding step is appropriately selected in accordance with a purpose of use of the molded product or the molding method. However, the temperature of the cured product in the injection molding preferably falls within the range of from 150° C. to 400° C., more preferably falls within the range of from 200° C. to 350° C., and particularly preferably falls within the range of from 200° C. to 330° C. When the cured product is molded in the temperature range, moderate flowability is imparted to the resin at the time of the molding, and hence the occurrence of a sink mark or strain in the optical element of the present invention serving as the molded product can be prevented. In addition, when the cured product is molded in the temperature range, the occurrence of a silver streak due to the thermal decomposition of the cured product can be prevented, and the yellowing of the optical element can be effectively prevented.

The optical element of the present invention can be utilized as an optical lens, such as a camera lens. In addition, an optical apparatus of the present invention includes the optical element of the present invention and is, for example, a camera having the optical lens.

The present invention is described in more detail below by way of Examples. The present invention is by no means limited to Examples described below without departing from the gist of the present invention. The molecular structure of a synthesized compound was analyzed with JNM-ECA400 NMR manufactured by JEOL Ltd. by dissolving 10 mg of the synthesized compound in 1 ml of chloroform. In addition, the following synthetic intermediate A and compound B were synthesized with reference to Japanese Patent Application Laid-Open No. 2014-43565, and the following compound A was synthesized with reference to Japanese Patent Application Laid-Open No. 2012-167019.

With regard to the analysis of a compound represented by the general formula (1) and a compound represented by the general formula (2), when all of $R_1$ to $R_4$ are identical to one another, and all of $Z_1$ to $Z_7$ are identical to one another, the analysis can be easily performed by comparing the NMR shift positions of atoms in the $R_1$ and the $R_2$, and the NMR shift positions of atoms in the $R_3$ and the $R_4$ corresponding thereto. Alternatively, whether an analyzed compound is the compound represented by the general formula (1) or the compound represented by the general formula (2) can be confirmed by confirming whether or not a (meth)acryloyl group is bonded to a structure represented by V through the analysis of the NMR shift position of the structure represented by the V.

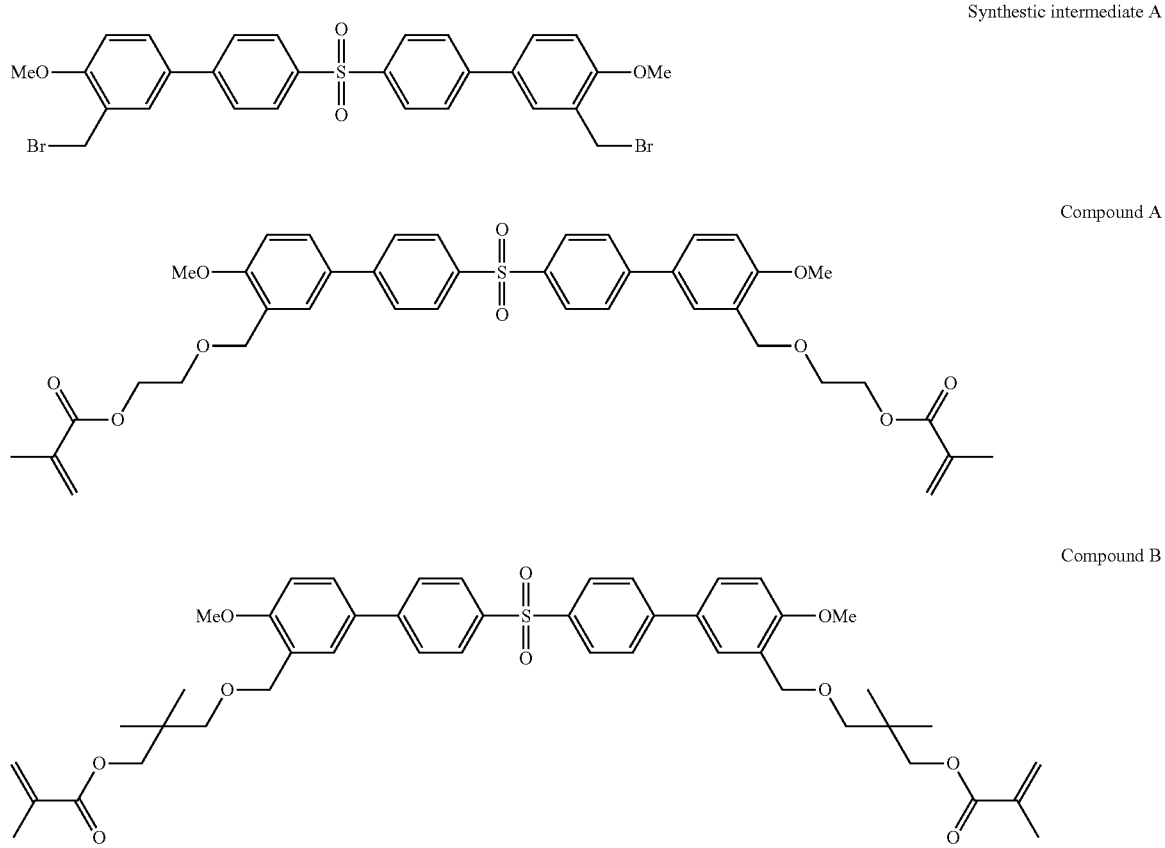

Synthestic intermediate A

Compound A

Compound B

Synthesis Example 1

Synthesis of Compound C

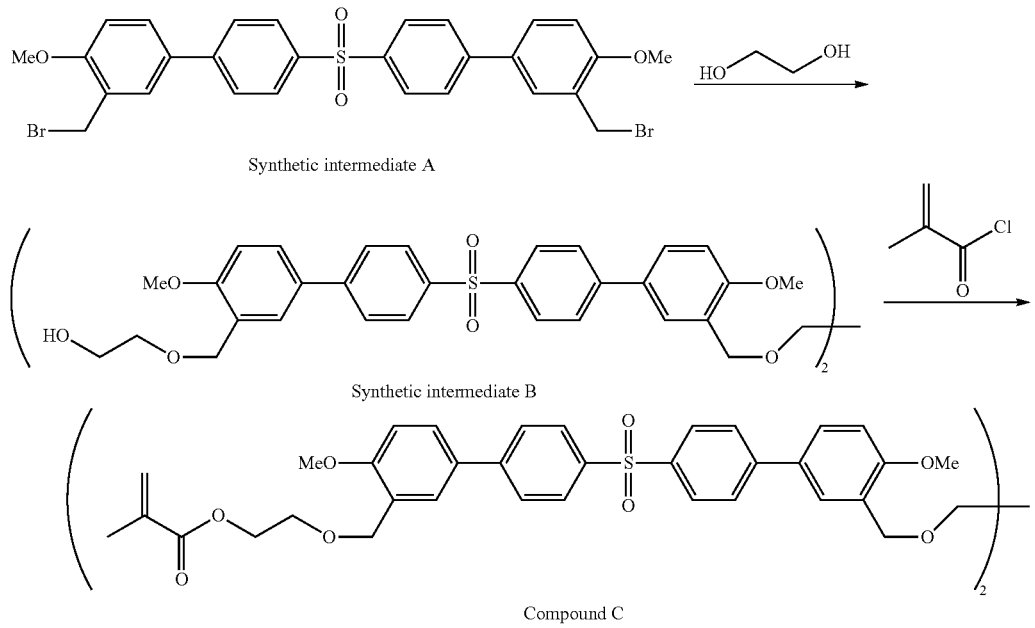

A solution of 55% sodium hydride (5 g) in tetrahydrofuran (200 ml) was cooled to 0° C., and 1,2-ethanediol (5 g) was slowly dropped thereinto. Thus, a sodium salt of 1,2-ethanediol was prepared. The synthetic intermediate A (30 g) was gradually added to the prepared liquid at 0° C., and the temperature of the reaction liquid was increased to 25° C. Then, the reaction liquid was stirred as it was for 12 hours. A reaction end point was identified while the extent to which a reaction advanced was observed by thin-layer chromatography (hereinafter "TLC"). After that, a saturated aqueous solution of ammonium chloride (30 ml) was gradually added to the reaction liquid to terminate the reaction. A crystal was precipitated by pouring the reaction-terminated liquid into water (300 ml), and the precipitated crystal was washed with water (100 ml), methanol (100 ml), and hexane (100 ml) in this order. Thus, 38 g of a synthetic intermediate B was obtained (yield: 72%).

Next, the synthetic intermediate B (38 g) was dissolved in ethyl acetate (100 ml). The solution was cooled to 10° C., and triethylamine (9 g) and methacryloyl chloride (11 g) were dropped thereinto in this order. After that, the mixture was stirred at the temperature for 6 hours while a reaction state was monitored by TLC. After that, the mixture was diluted with toluene (300 ml). A 10% aqueous solution of sodium hydroxide (70 ml) was added to the toluene-diluted liquid, and the mixture was stirred. After that, the aqueous phase was separated and the remaining organic phase was washed with water (100 ml) twice. The organic phase was concentrated and then purified by silica gel column chromatography, and the resultant crude product was recrystallized from a mixed solvent of ethyl acetate and hexane. Thus, 28 g of a compound C serving as a white crystal was obtained (yield: 65%).

$^1$H-NMR (CDCl$_3$; TMS): δ1.45 (d, 6H), 3.32-4.04 (m, 12H), 3.86 (s, 6H), 3.89 (s, 6H), 4.59-4.68 (m, 8H), 5.45-5.49 (m, 2H), 6.04-6.11 (m, 2H), 6.92-6.97 (m, 4H), 7.14-7.20 (m, 4H), 7.22-7.28 (m, 4H), 7.57-7.69 (m, 8H), 7.95-8.05 (m, 8H)

Synthesis Example 2

Synthesis of Compound D

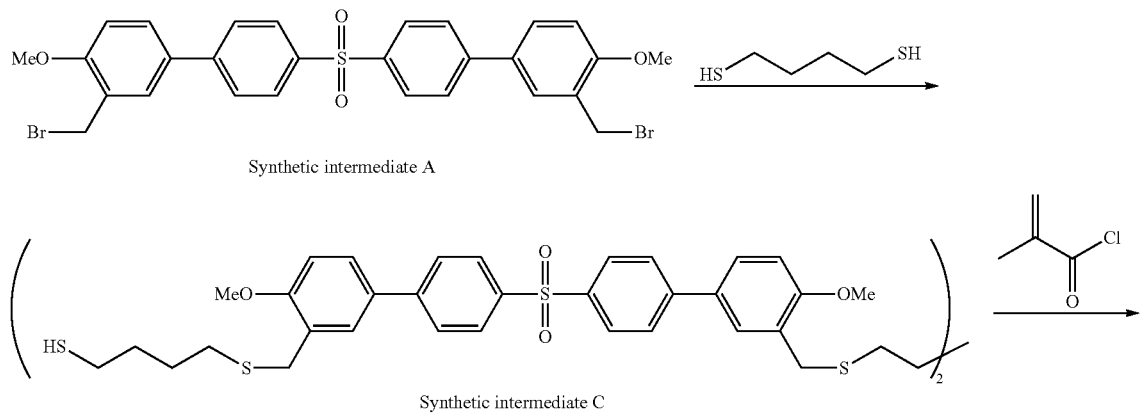

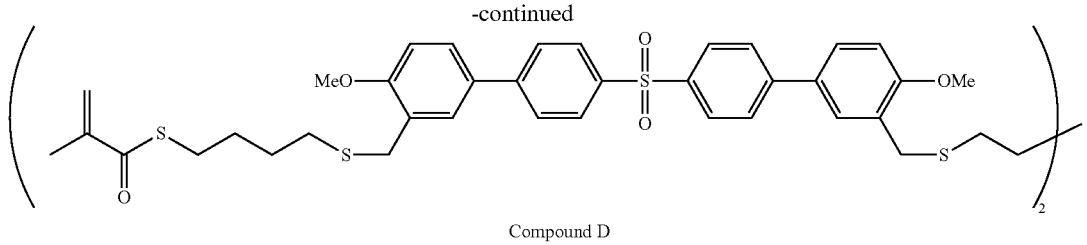

Compound D

A solution of 55% sodium hydride (5 g) in tetrahydrofuran (200 ml) was cooled to 0° C., and 1,4-butanedithiol (10 g) was slowly dropped thereinto. Thus, a sodium salt of 1,4-butanedithiol was prepared. The synthetic intermediate A (30 g) was gradually added to the prepared liquid at 0° C., and the temperature of the reaction liquid was increased to 25° C. Then, the reaction liquid was stirred as it was for 12 hours. A reaction end point was identified while the extent to which a reaction advanced was observed by TLC. After that, a saturated aqueous solution of ammonium chloride (30 ml) was gradually added to the reaction liquid to terminate the reaction. A crystal was precipitated by pouring the reaction-terminated liquid into water (300 ml), and the precipitated crystal was washed with water (100 ml), methanol (100 ml), and hexane (100 ml) in this order. Thus, 38 g of a synthetic intermediate C was obtained (yield: 61%).

concentrated and then purified by silica gel column chromatography, and the resultant crude product was recrystallized from a mixed solvent of ethyl acetate and hexane. Thus, 24 g of a compound D serving as a white crystal was obtained (yield: 58%).

$^1$H-NMR (CDCl$_3$; TMS): δ1.44 (d, 6H), 1.48-1.95 (m, 12H), 2.43-2.87 (m, 12H), 3.85 (s, 6H), 3.87 (s, 6H), 3.56-4.03 (m, 8H), 5.15-5.29 (m, 2H), 5.89-6.03 (m, 2H), 6.90-6.95 (m, 4H), 7.08-7.16 (m, 4H), 7.20-7.28 (m, 4H), 7.54-7.68 (m, 8H), 7.93-8.02 (m, 8H)

Synthesis Example 3

Synthesis of Compound E

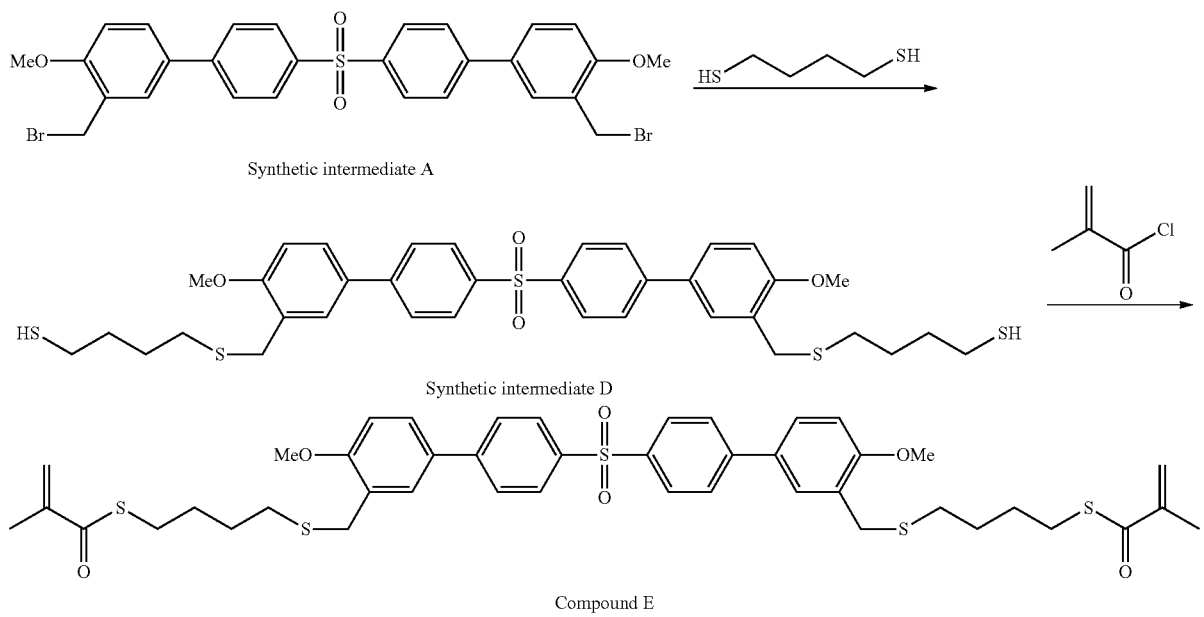

Compound E

Next, the synthetic intermediate C (38 g) was dissolved in ethyl acetate (100 ml). Then, the solution was cooled to 10° C., and triethylamine (9 g) and methacryloyl chloride (11 g) were dropped thereinto in this order. After that, the mixture was stirred at the temperature for 6 hours while a reaction state was monitored by TLC. After that, the mixture was diluted with toluene (300 ml). A 10% aqueous solution of sodium hydroxide (70 ml) was added to the toluene-diluted liquid, and the mixture was stirred. After that, the aqueous phase was separated and the remaining organic phase was washed with water (100 ml) twice. The organic phase was A solution of 55% sodium hydride (5 g) in tetrahydrofuran (200 ml) was cooled to 0° C., and 1,4-butanedithiol (18 g) was slowly dropped thereinto. Thus, a sodium salt of 1,4-butanedithiol was prepared. The synthetic intermediate A (30 g) was gradually added to the prepared liquid, and the temperature of the reaction liquid was increased to 25° C. Then, the reaction liquid was stirred as it was for 12 hours. A reaction end point was identified while the extent to which a reaction advanced was observed by TLC. After that, a saturated aqueous solution of ammonium chloride (30 ml) was gradually added to the reaction liquid to terminate the reaction. A crystal was precipitated by pouring the reaction-terminated liquid into water (300 ml), and the precipitated crystal was washed with water (100 ml), methanol (100 ml), and hexane (100 ml) in this order. Thus, 28 g of a synthetic intermediate D was obtained (yield: 82%).

Next, the synthetic intermediate D (28 g) was dissolved in ethyl acetate (100 ml). The solution was cooled to 10° C., and triethylamine (6 g) and methacryloyl chloride (7 g) were dropped thereinto in this order. After that, the mixture was stirred at the temperature for 6 hours while a reaction state was monitored by TLC. After that, the mixture was diluted with toluene (300 ml). A 10% aqueous solution of sodium hydroxide (70 ml) was added to the toluene-diluted liquid, and the mixture was stirred. After that, the aqueous phase was separated and the remaining organic phase was washed with water (100 ml) twice. The organic phase was concentrated and then purified by silica gel column chromatography, and the resultant crude product was recrystallized from a mixed solvent of ethyl acetate and hexane. Thus, 21 g of a compound E serving as a white crystal was obtained (yield: 63%).

$^1$H-NMR (CDCl$_3$; TMS): δ1.43 (d, 6H), 1.54-1.86 (m, 8H), 2.43-2.68 (m, 8H), 3.84 (s, 6H), 3.51-4.01 (m, 4H), 5.14-5.28 (m, 2H), 5.86-6.04 (m, 2H), 6.88-6.94 (m, 2H), 7.03-7.15 (m, 2H), 7.16-7.27 (m, 2H), 7.53-7.68 (m, 4H), 7.94-8.05 (m, 4H)

Synthesis Example 4

Synthesis of Compound F

The following compound F was synthesized with reference to synthesis methods disclosed in Japanese Patent Application Laid-Open No. 2012-167019 and Japanese Patent Application Laid-Open No. 2014-43565 while reagents were changed.

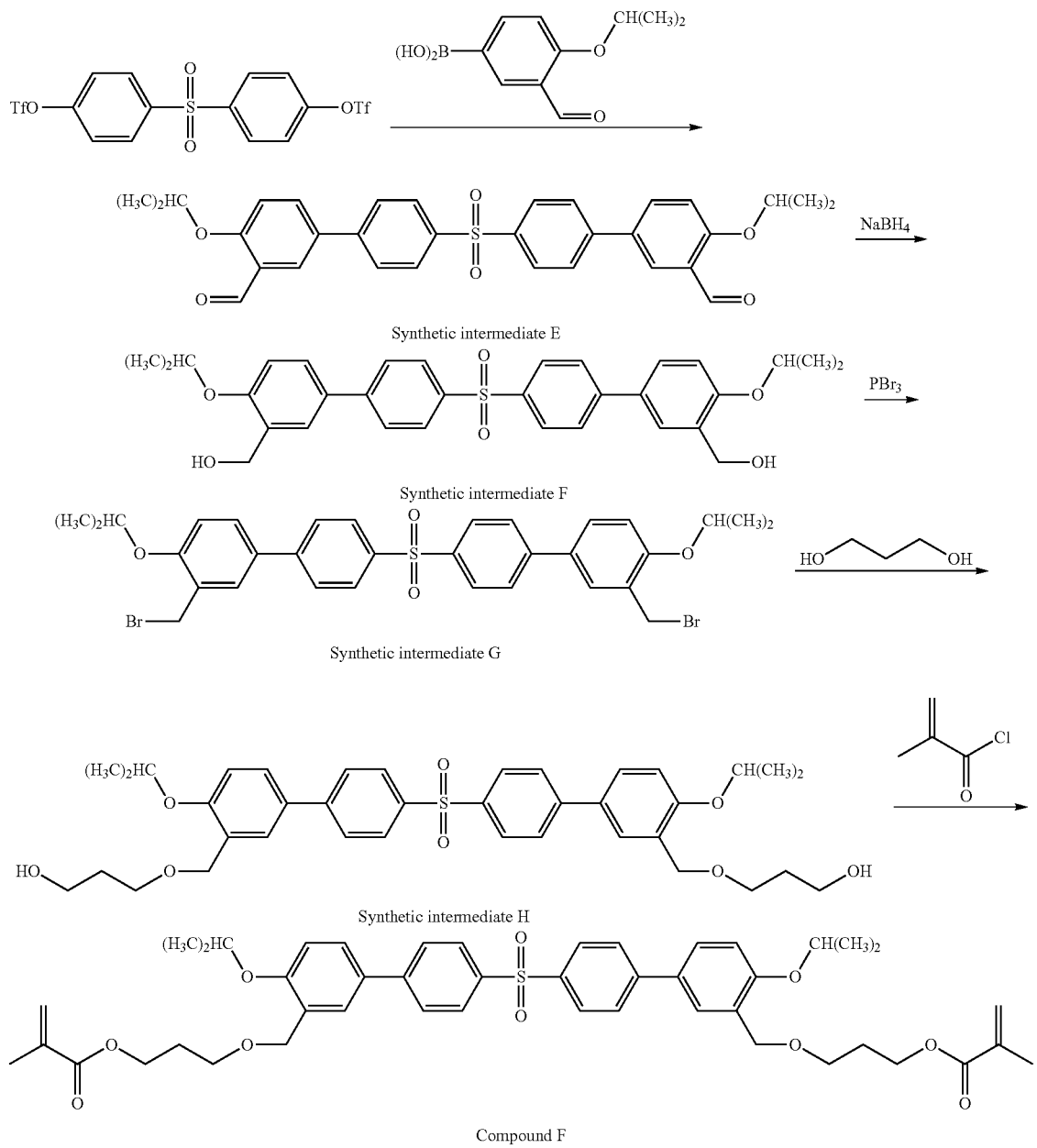

Compound F

Diphenylsulfone-4,4'-diylbis(trifluoromethanesulfonate) (28 g) synthesized with reference to Japanese Patent Application Laid-Open No. 2012-167019, 3-formyl-4-isopropyloxyphenylboronic acid (27 g), sodium hydrogen carbonate (30 g), tetrakis(triphenylphosphine)palladium (1.3 g), 1,4-dioxane (500 ml), and water (250 ml) were mixed in a reaction vessel, and the mixture was stirred at a reaction temperature of 80° C. for 3 hours. Next, 250 ml of water was added to the resultant reaction solution, and then the reaction solution was stirred at 80° C. for 1 hour, followed by the filtration and recovery of the precipitated crystal (crude crystal). After that, the crude crystal was washed with ethanol, and was then purified by recrystallization from a mixed solvent of hexane and ethyl acetate. Thus, a synthetic intermediate E was obtained as a pale gray crystal.

Next, the resultant crystal was dissolved in methanol (200 ml) and tetrahydrofuran (200 ml), and the reaction solution was cooled to 0° C. After that, sodium borohydride (12 g) was slowly added to the solution, and the mixture was stirred at the temperature for 3 hours. After a reaction end point had been identified by TLC, a 2 N aqueous solution of hydrochloric acid (50 ml) was slowly added to the mixture, and the resultant reaction solution was stirred at room temperature for 1 hour. The produced crystal was washed with an aqueous solution of sodium hydrogen carbonate and water in this order, and was purified by recrystallization from a mixed solvent of ethanol, ethyl acetate, and hexane. Thus, 27 g of a synthetic intermediate F was obtained (in 2 steps, yield: 90%).

The synthetic intermediate F (27 g) was dissolved in dichloromethane (300 ml). A reaction vessel was cooled to 0° C. and phosphorus tribromide (27 g) was slowly dropped into the solution. After the total amount of phosphorus tribromide had been dropped, the reaction solution was stirred for 3 hours while its temperature was increased to 20° C. The reaction solution was poured into water (2 L) at 10° C. or less with stirring, and the reaction was terminated by stirring the mixture at it was for 0.5 hour. Only the organic phase was separated from the mixed liquid containing the organic phase and the aqueous phase, and was evaporated to dryness by removing the solvent with an evaporator. 100 Milliliters of tetrahydrofuran was added to the dry product to dissolve the product.

The solution was poured into a container containing 2 L of water with stirring. Thus, a crystal was precipitated. The precipitated crystal was filtered, and the filtrate was washed with water until the filtrate became neutral. After that, the resultant crystal was washed with methanol (100 ml). The resultant crystal was dried by air blowing for 24 hours, and was then dried with warm air at 70° C. for 24 hours to provide 29 g of a synthetic intermediate G (yield: 88%).

A solution of 55% sodium hydride (3 g) in tetrahydrofuran (150 ml) was cooled to 0° C., and 1,3-propanediol (7 g) was slowly dropped thereinto. Thus, a sodium salt of 1,4-butanedithiol was prepared. The synthetic intermediate G (20 g) was gradually added to the prepared liquid, and the temperature of the reaction liquid was increased to 25° C. Then, the reaction liquid was stirred as it was for 12 hours. A reaction end point was identified while the extent to which a reaction advanced was observed by TLC. After that, a saturated aqueous solution of ammonium chloride (30 ml) was gradually added to the reaction liquid to terminate the reaction. A crystal was precipitated by pouring the reaction-terminated liquid into water (300 ml), and the precipitated crystal was washed with water (100 ml), methanol (100 ml), and hexane (100 ml) in this order. Thus, 17 g of a synthetic intermediate H was obtained (yield: 88%).

Next, the synthetic intermediate H (15 g) was dissolved in ethyl acetate (70 ml). Then, the solution was cooled to 10° C., and triethylamine (6 g) and methacryloyl chloride (7 g) were dropped thereinto in this order. After that, the mixture was stirred at the temperature for 6 hours while a reaction state was monitored by TLC. After that, the mixture was diluted with toluene (200 ml). A 10% aqueous solution of sodium hydroxide (30 ml) was added to the toluene-diluted liquid, and the mixture was stirred. After that, the aqueous phase was separated and the remaining organic phase was washed with water (40 ml) twice. The organic phase was concentrated and then purified by silica gel column chromatography, and the resultant crude product was recrystallized from a mixed solvent of ethyl acetate and hexane. Thus, 11 g of a compound F serving as a white crystal was obtained (yield: 63%).

$^1$H-NMR (CDCl$_3$; TMS): δ1.52 (d, 12H), 1.73-1.92 (m, 4H), 1.98 (s, 6H), 3.37-3.72 (m, 6H), 4.01 (t, 4H), 4.08-4.23 (m, 4H), 5.15-5.26 (m, 2H), 5.84-6.03 (m, 2H), 6.85-6.91 (m, 2H), 7.05-7.19 (m, 2H), 7.19-7.28 (m, 2H), 7.53-7.70 (m, 4H), 7.93-8.04 (m, 4H)

Synthesis Example 5

Synthesis of Compound G

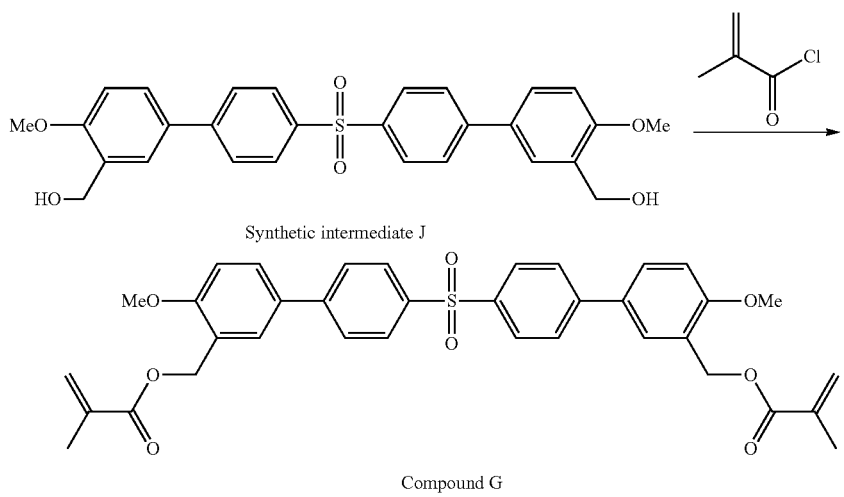

Synthetic intermediate J

Compound G

The synthetic intermediate J (20 g) was dissolved in ethyl acetate (70 ml). Then, the solution was cooled to 10° C., and triethylamine (12 g) and methacryloyl chloride (11 g) were dropped thereinto in this order. After that, the mixture was stirred at the temperature for 6 hours while a reaction state was monitored by TLC. After that, the mixture was diluted with toluene (200 ml). A 10% aqueous solution of sodium hydroxide (40 ml) was added to the toluene-diluted liquid, and the mixture was stirred. After that, the aqueous phase was separated and the remaining organic phase was washed with water (50 ml) twice. The organic phase was concentrated and then purified by silica gel column chromatography, and the resultant crude product was recrystallized from a mixed solvent of ethyl acetate and hexane. Thus, 15 g of a compound G serving as a white crystal was obtained (yield: 58%).

$^1$H-NMR (CDCl$_3$; TMS): δ2.02 (s, 6H), 3.72 (s, 6H), 4.24 (s, 4H), 5.17-5.28 (m, 2H), 5.90-6.05 (m, 2H), 6.86-6.90 (m, 2H), 7.04-7.17 (m, 2H), 7.15-7.25 (m, 2H), 7.55-7.67 (m, 4H), 7.91-8.01 (m, 4H)

(Procedure for Production of Evaluation Sample)
(1) Preparation of Optical Composition A compound represented by the general formula (1) and a compound represented by the general formula (2) were weighed and mixed so that the contents of the respective materials became contents described in Examples or Comparative Examples. 0.2 Mass percent of 4-methoxyphenol serving as a polymerization inhibitor, 0.2 mass % of 1-hydroxy-cyclohexyl phenyl ketone (IRGACURE 184/manufactured by BASF (former Ciba)) serving as a polymerization initiator, and 10 mass % of an alkoxylated aliphatic diacrylate with respect to the mixture were weighed, and all the materials were dissolved in acetone and mixed. After that, acetone was removed by distillation. Thus, an optical composition was prepared.

Example 1

An optical composition prepared in accordance with the procedure for the production of an evaluation sample, the composition containing 1.0 mass % of the compound C with respect to the compound A.

Example 2

An optical composition prepared in accordance with the procedure for the production of an evaluation sample, the composition containing 5.0 mass % of the compound C with respect to the compound A.

Example 3

An optical composition prepared in accordance with the procedure for the production of an evaluation sample, the composition containing 10.0 mass % of the compound C with respect to the compound A.

Example 4

An optical composition prepared in accordance with the procedure for the production of an evaluation sample, the composition containing 5.0 mass % of the compound C with respect to the compound B.

Example 5

An optical composition prepared in accordance with the procedure for the production of an evaluation sample, the composition containing 5.0 mass % of the compound D with respect to the compound E.

Example 6

An optical composition prepared in accordance with the procedure for the production of an evaluation sample, the composition containing 5.0 mass % of the compound C with respect to the compound E.

Example 7

An optical composition prepared in accordance with the procedure for the production of an evaluation sample, the composition containing 5.0 mass % of the compound C with respect to the compound F.

Example 8

An optical composition prepared in accordance with the procedure for the production of an evaluation sample, the composition containing 5.0 mass % of the compound C with respect to the compound G.

Comparative Example 1

An optical composition prepared in accordance with the procedure for the production of an evaluation sample, the composition containing 0.3 mass % of the compound C with respect to the compound A.

Comparative Example 2

An optical composition prepared in accordance with the procedure for the production of an evaluation sample, the composition containing 11.0 mass % of the compound C with respect to the compound A.

Comparative Example 3

An optical composition prepared in accordance with the procedure for the production of an evaluation sample, the composition containing 0.3 mass % of the compound C with respect to the compound B.

Comparative Example 4

An optical composition prepared in accordance with the procedure for the production of an evaluation sample, the composition containing 0.3 mass % of the compound C with respect to the compound E.

Comparative Example 5

An optical composition prepared in accordance with the procedure for the production of an evaluation sample, the composition containing 5.0 mass % of the compound B with respect to the compound A.

Comparative compound A

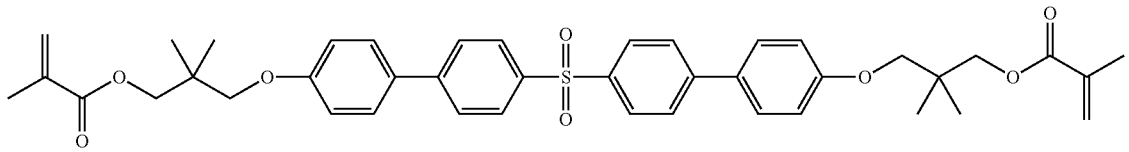

Comparative Example 6

An optical composition prepared in accordance with the procedure for the production of an evaluation sample, the composition containing 10.0 mass % of the compound C with respect to ethoxylated (2) bisphenol A dimethacrylate (comparative compound B).

Comparative compound B

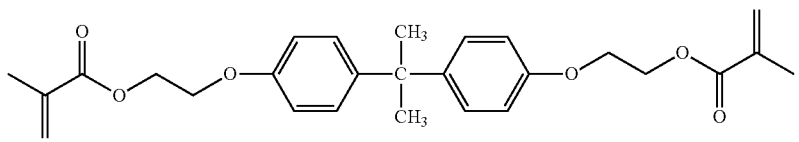

(2) Production of Evaluation Sample (2a) Sample for Refractive Index Measurement Two disc-type glass substrates each having a diameter of 30 mm were prepared, and the optical composition serving as a measuring object, the composition containing the polymerization inhibitor, the polymerization initiator, and the like, was sandwiched between the glass substrates having placed therebetween a spacer so as to have a uniform thickness of 500 µm. The optical composition sandwiched between the two glass substrates was cured by irradiating the sample with UV light. Thus, a sample for refractive index measurement was produced.

(2b) Sample for Confirmation of Crystallization

A brown bottle (10 ml) was filled with 5±1 g of the optical composition of each of Examples and Comparative Examples serving as a measuring object, and was left at rest in a thermostatic bath at 80° C. for 1 hour. After that, the bottle was left at rest in a thermostatic bath at 23° C.

(Method of evaluating Produced Sample)

(3) Measurement and Evaluation (3a) Refractive Index, Dispersion Characteristic (Abbe Number), and Secondary Dispersion Characteristic (θg,F)

Measurement was performed with an Abbe refractometer (Kalnew Optical Industrial Co., Ltd.). A refractive index at a wavelength of 587.6 nm, and a dispersion characteristic and a secondary dispersion characteristic calculated from the following equations are shown in the table.

Abbe number (dispersion characteristic): $[v_d]= (n_d-1)/(n_F-n_C)$

Secondary dispersion characteristic: $[\theta g, F]= (n_g-n_F)/(n_F-n_C)$ (3b) Confirmation of Crystallization The sample for the confirmation of crystallization was left at rest in the thermostatic bath at 23° C. for 24 hours, and was then removed from the thermostatic bath. Then, the sample for the confirmation of crystallization was irradiated with light from the outside of the brown bottle by using the LED light of SPA-10SD manufactured by Hayashi Watch-Works Co., Ltd., and the presence or absence of the occurrence of a crystal having a size that was able to be visually observed (crystal whose longest side had a length of 2 mm or more) in the sample for the confirmation of crystallization was confirmed. An example in which a crystal whose longest side had a length of 2 mm or more occurred was evaluated as D, an example in which a crystal whose longest side had a length of 1 mm or more and less than 2 mm occurred was evaluated as C, an example in which a crystal whose longest side had a length of less than 1 mm occurred was evaluated as B, and an example in which no crystal occurred was evaluated as A. The results are shown in the table.

The reasons why the time period for which the bottle was left at rest in the thermostatic bath was set to 24 hours are as described below. When the heated optical composition is directly stored in a refrigerator or a freezer, a harmful effect, such as the breakage of the container or the warming of a substance that has already been stored, occurs. Therefore, the optical composition needs to be placed in the refrigerator or the freezer after having been cooled to 23° C. over 24 hours. In addition, when a component in the optical composition crystallizes in the cooling step, unevenness occurs in a cured product obtained by polymerizing the optical composition.

TABLE 1

|  | Refractive index | Abbe number | θ g, F | Crystallization |
|---|---|---|---|---|
| Example 1 | 1.602 | 21.1 | 0.72 | A |
| Example 2 | 1.602 | 21.1 | 0.72 | A |
| Example 3 | 1.602 | 21.1 | 0.72 | B |
| Example 4 | 1.601 | 21.2 | 0.71 | B |
| Example 5 | 1.602 | 21.2 | 0.72 | B |
| Example 6 | 1.602 | 21.2 | 0.72 | B |
| Example 7 | 1.601 | 21.3 | 0.71 | B |
| Example 8 | 1.604 | 20.6 | 0.74 | B |
| Comparative Example 1 | 1.602 | 21.1 | 0.72 | D |
| Comparative Example 2 | 1.602 | 21.1 | 0.72 | C |
| Comparative Example 3 | 1.601 | 21.2 | 0.71 | C |
| Comparative Example 4 | 1.602 | 21.2 | 0.72 | D |
| Comparative Example 5 | 1.602 | 21.0 | 0.72 | D |
| Comparative Example 6 | 1.598 | 22.3 | 0.69 | A |

The optical composition of the present invention can suppress the occurrence of the unevenness of a cured product obtained by polymerizing the optical composition due to crystallization because the composition can suppress the crystallization. Further, the cured product of the present invention obtained by polymerizing the optical composition of the present invention and the optical element of the present invention obtained by molding the cured product each have the following characteristics: the dispersion characteristic (Abbe number ($v_d$)) and secondary dispersion characteristic ($\theta g,F$) of refractive indices are high (high $\theta g,F$ characteristic), and a chromatic aberration-correcting function is high. Accordingly, the optical element can be utilized in an apparatus having a plurality of lenses, such as camera lenses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-093263, filed May 6, 2016, which is hereby incorporated by reference herein in its entirety.

What is claimed is:

1. A material comprising:
   first compound represented by general formula (1) and
   a second compound represented by general formula (2),
   wherein the first compound and the second compound are polymerized with each other, and
   wherein a content of the second compound in the material is 1.0 mass % to 10.0 mass % with respect to the first compound:

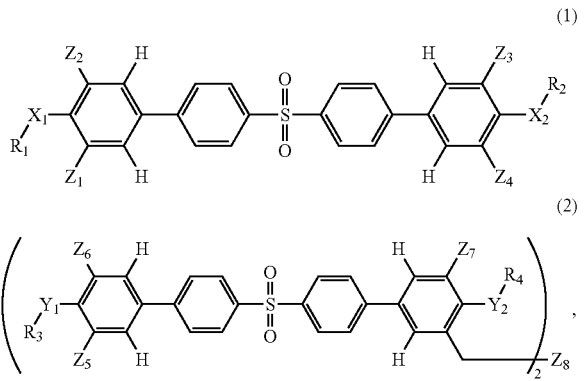

wherein, in the general formula (1) and the general formula (2):

$X_1$, $X_2$, $Y_1$, and $Y_2$ each represents O or S, and may be identical to or different from one another;

$R_1$ to $R_4$ each represents one selected from the group consisting of a methyl group, an ethyl group, a propyl group, an isopropyl group, an allyl group, a 2-(meth)acryloyloxyethyl group, a 3-(meth)acryloyloxypropyl group, and a 4-(meth)acryloyloxybutyl group, and may be identical to or different from one another;

$Z_1$, $Z_4$, and $Z_6$ each represents a structure represented by general formula (3);

$Z_2$, $Z_3$, $Z_5$, and $Z_7$ each represents one selected from the group consisting of a hydrogen atom, a methyl group, an ethyl group, an isopropyl group, a methoxy group, an ethoxy group, an isopropoxy group, a methylthio group, an ethylthio group, a propylthio group, a 2-(meth)acryloyloxyethoxy group, a 3-(meth)acryloyloxypropoxy group, a 4-(meth)acryloyloxybutoxy group, and a structure represented by the general formula (3), and may be identical to or different from one another; and $Z_8$ represents V in a structure represented by the general formula (3):

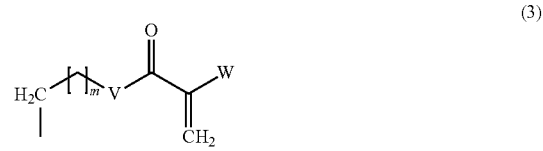

wherein, in the general formula (3), m represents 0 or 1, W represents a hydrogen atom or a methyl group, and V is selected from the group consisting of:

*—O—**;
*—S—**;
*—O—$C_nH_{2n}$—O—**;
*—S—$C_nH_{2n}$—O—**;
*—O—$C_nH_{2n}$—S—**; and
*—S—$C_nH_{2n}$—S—**, where, in each of the $Z_1$ to the $Z_7$, * represents a bonding site with an alkylene moiety and ** represents a bonding site with a (meth)acryloyl group, and where, in the $Z_8$, the V does not represent *—O—** and *—S—**, and each of * and ** represents a bonding site with an alkylene moiety, and a structure represented by $C_nH_{2n}$ in the V may have a substituent on a carbon atom, and n represents an integer selected from the group consisting of 2 to 5.

2. An optical element comprising an optical member, wherein the optical member comprises:
   a first compound represented by general formula (1): and
   a second compound represented by general formula (2),
   wherein the first compound and the second compound are polymerized with each other, and
   wherein a content of the second compound in the optical member is 1.0 mass% to 10.0 mass% with respect to the first compound:

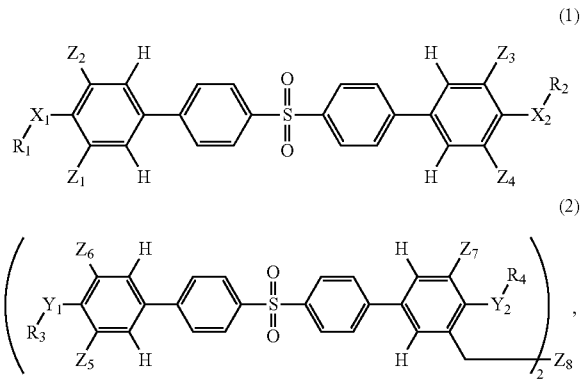

wherein, in the general formula (1) and the general formula (2):

$X_1$, $X_2$, $Y_1$, and $Y_2$ each represents O or S, and may be identical to or different from one another;

$R_1$ to $R_4$ each represents one selected from the group consisting of a methyl group, an ethyl group, a propyl group, an isopropyl group, an allyl group, a 2-(meth)acryloyloxyethyl group, a 3-(meth)acryloyloxypropyl group, and a 4-(meth)acryloyloxybutyl group, and may be identical to or different from one another;

$Z_1$, $Z_4$, and $Z_6$ each represents a structure represented by general formula (3);

$Z_2$, $Z_3$, $Z_5$, and $Z_7$ each represents one selected from the group consisting of a hydrogen atom, a methyl group, an ethyl group, an isopropyl group, a methoxy group, an ethoxy group, an isopropoxy group, a methylthio group, an ethylthio group, a propylthio group, a 2-(meth)acryloyloxyethoxy group, a 3-(meth)acryloyloxypropoxy group, a 4-(meth)acryloyloxybutoxy group, and a structure represented by the general formula $Z_8$ represents V in a structure represented by the general formula (3):

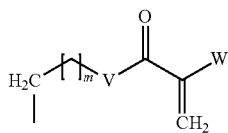

(3)

wherein, in the general formula (3), m represents 0 or 1, W represents a hydrogen atom or a methyl group, and V is selected from the group consisting of:

\*—O—\*\*;
\*—S—\*\*;
\*—O—$C_nH_{2n}$—O—\*\*;
\*—S—$C_nH_{2n}$—O—\*\*;
\*—O—$C_nH_{2n}$—S—\*\*; and
\*—S—$C_nH_{2n}$—S—\*\*, where, in each of the $Z_1$ to the $Z_7$, \* represents a bonding site with an alkylene moiety and \*\* represents a bonding site with a (meth)acryloyl group, and where, in the $Z_8$, the V does not represent \*—O—\*\* and \*—S—\*\*, and each of \* and \*\* represents a bonding site with an alkylene moiety, and a structure represented by $C_nH_{2n}$ in the V may have a substituent on a carbon atom, and n represents an integer selected from the group consisting of 2 to 5.

3. An optical element according to claim 2, wherein the optical element is a lens comprising a base material, and
wherein the optical member is arranged to the base material.

4. An optical element according to claim 2, wherein the optical element is a arranged between two base materials.

5. An optical apparatus, comprising the optical element of claim 2.

6. The material according to claim 1, wherein the $X_1$, the $X_2$, the $Y_1$, and the $Y_2$ each represents O.

7. The material according to claim 1, wherein:
the $R_1$ to the $R_4$ each represents one selected from the group consisting of a methyl group, an ethyl group, a propyl group, and an isopropyl group; and
the $Z_2$, the $Z_3$, the $Z_5$, and the $Z_7$ each represents one selected from the group consisting of a hydrogen atom, a methyl group, an ethyl group, and an isopropyl group.

8. The material according to claim 1, wherein:
the $R_1$ to the $R_4$ each represents a methyl group or an isopropyl group; and
the $Z_2$, the $Z_3$, the $Z_5$, and the $Z_7$ each represents a hydrogen atom.

9. The material according to claim 1, wherein, in the general formula (3), the m represents 0 and the V represents any one of:

\*—O—\*\*;
\*—S—\*\*;
\*—O—$CH_2CH_2$—O—\*\*;
\*—O—$CH_2CH_2CH_2$—O—\*\*;
\*—O—$CH_2CH_2CH_2CH_2$—O—\*\*;
\*—O—$CH_2C(CH_3)_2CH_2$—O—\*\*;
\*—S—$CH_2CH_2$—S—\*\*;
\*—S—$CH_2CH_2CH_2$—S—\*\*;
\*—S—$CH_2CH_2CH_2CH_2$—S—\*\*; and
\*—S—$CH_2C(CH_3)_2CH_2$—S—\*\*, provided that in each of the $Z_1$ to the $Z_7$, \* represents a bonding site with an alkylene moiety and \*\* represents a bonding site with a (meth)acryloyl group, and in the $Z_8$, the V does not represent \*—O—\*\* and \*—S—\*\*, and both of \* and \*\* each represents a bonding site with an alkylene moiety.

10. A method of producing a material, comprising:
preparing an optical composition containing at least a first compound represented by general formula (1) and a second compound represented by general formula (2), a content of the second compound in the optical composition being 1.0 mass % to 10.0 mass % with respect to the first compound; and
polymerizing the optical composition to cure the composition:

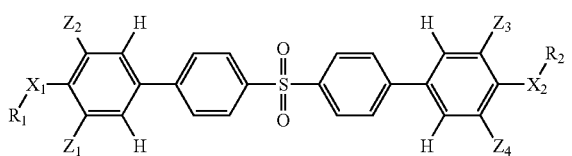

(1)

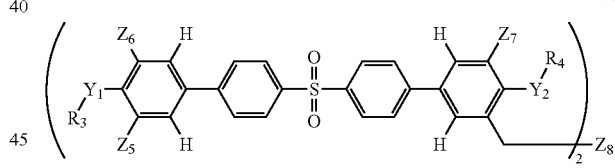

(2)

wherein, in the general formula (1) and the general formula (2):

$X_1$, $X_2$, $Y_1$, and $Y_2$ each represents O or S, and may be identical to or different from one another;

$R_1$ to $R_4$ each represents one selected from the group consisting of a methyl group, an ethyl group, a propyl group, an isopropyl group, an allyl group, a 2-(meth)acryloyloxyethyl group, a 3-(meth)acryloyloxypropyl group, and a 4-(meth)acryloyloxybutyl group, and may be identical to or different from one another;

$Z_1$, $Z_4$, and $Z_6$ each represents a structure represented by general formula (3);

$Z_2$, $Z_3$, $Z_5$, and $Z_7$ each represents one selected from the group consisting of a hydrogen atom, a methyl group, an ethyl group, an isopropyl group, a methoxy group, an ethoxy group, an isopropoxy group, a methylthio group, an ethylthio group, a propylthio group, a 2-(meth)acryloyloxyethoxy group, a 3-(meth)acryloyloxypropoxy group, a 4-(meth)acryloyloxybutoxy group, and a structure represented by the general formula (3), and may be identical to or different from one another; and $Z_8$ represents V in a structure represented by the general formula (3):

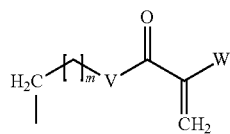

(3)

wherein, in the general formula (3), m represents 0 or 1, W represents a hydrogen atom or a methyl group, and V is selected from the group consisting of:

*—O—**;
*—S—**;
*—O—$C_nH_{2n}$—O—**;
*—S—$C_nH_{2n}$—O—**;
*—O—$C_nH_{2n}$—S—**; and
*—S—$C_nH_{2n}$—S—**, where, in each of the $Z_1$ to the $Z_7$, * represents a bonding site with an alkylene moiety and ** represents a bonding site with a (meth)acryloyl group, and where, in the $Z_8$, the V does not represent *—O—** and *—S—**, and each of * and ** represents a bonding site with an alkylene moiety, and a structure represented by $C_nH_{2n}$ in the V may have a substituent on a carbon atom, and n represents an integer selected from the group consisting of 2 to 5.

11. The method according to claim 10, wherein the optical composition further contains a polymerizable material capable of copolymerizing with the first compound and the second compound.

12. The method according to claim 11, wherein the first compound and the second compound are dispersed into the polymerizable material.

13. The method according to claim 10, wherein the optical composition further contains a matrix polymer compound.

14. The optical apparatus according to claim 5, wherein the optical apparatus is a camera.

* * * * *